United States Patent
Inoue et al.

(10) Patent No.: US 10,591,135 B2
(45) Date of Patent: Mar. 17, 2020

(54) LED LIGHTING DEVICE, AND METHOD OF EXTRACTING LIGHT USING LED LIGHTING DEVICE

(71) Applicants: FURUKAWA ELECTRIC CO., LTD., Tokyo (JP); TOTOKU ELECTRIC CO., LTD., Tokyo (JP)

(72) Inventors: Syouta Inoue, Tokyo (JP); Tetsuji Kubota, Tokyo (JP); Syunji Yamamoto, Tokyo (JP); Hisashi Koaizawa, Tokyo (JP); Tomio Kaise, Tokyo (JP)

(73) Assignees: FURUKAWA ELECTRIC CO., LTD., Tokyo (JP); TOTOKU ELECTRIC CO., LTD., Tokyo (JP)

( * ) Notice: Subject to any disclaimer, the term of this patent is extended or adjusted under 35 U.S.C. 154(b) by 48 days.

(21) Appl. No.: 15/923,580

(22) Filed: Mar. 16, 2018

(65) Prior Publication Data
US 2018/0216799 A1 Aug. 2, 2018

Related U.S. Application Data

(63) Continuation of application No. PCT/JP2016/077676, filed on Sep. 20, 2016.

(30) Foreign Application Priority Data

Sep. 17, 2015 (JP) .................... 2015-184351
Jan. 5, 2016 (JP) .................... 2016-000617
(Continued)

(51) Int. Cl.
*F21V 7/04* (2006.01)
*F21V 23/00* (2015.01)
(Continued)

(52) U.S. Cl.
CPC .................. *F21V 7/04* (2013.01); *B60Q 3/60* (2017.02); *B60Q 3/74* (2017.02); *F21V 9/08* (2013.01);
(Continued)

(58) Field of Classification Search
CPC .......... F21S 43/243; F21S 43/30; F21S 43/31; F21S 43/315; F21S 43/40; F21V 13/04;
(Continued)

(56) References Cited

U.S. PATENT DOCUMENTS 6,837,602 B1 * 1/2005 Lee ...................... B60Q 1/0052
362/330
2004/0120160 A1 * 6/2004 Natsume .............. B60Q 1/0058
362/544
(Continued)

FOREIGN PATENT DOCUMENTS

DE 112013004356 T5 5/2015
EP 2148129 A1 1/2010
(Continued)

OTHER PUBLICATIONS

Extended European Search Report issued to Application No. 16846682.9, dated Apr. 15, 2019.
(Continued)

*Primary Examiner* — Zheng Song
(74) *Attorney, Agent, or Firm* — Marshall, Gerstein & Borun LLP

(57) ABSTRACT

A frame has an outer frame made of microcellular foam resin, and two inner frames made of the microcellular foam resin. The two inner frames are arranged together inside the outer frame. Both of the inner frames and the outer frame include openings provided at respective upper portions and recess portions formed downwardly from the openings, respectively. An LED light source, which is arranged inside
(Continued)

a light guide space, emits light with a light emitting face thereof directing toward the light guide space. Accordingly, light from the LED light source is uniformly emitted from a light extraction portion. Also, an LED light source arranged inside a light guide space emits light directing toward the light guide space. Accordingly, light from the LED light source is uniformly emitted from a light extraction portion.

39 Claims, 24 Drawing Sheets

(30) Foreign Application Priority Data

| Apr. 18, 2016 | (JP) | ................................. 2016-082823 |
| Sep. 9, 2016 | (JP) | ................................. 2016-176456 |

(51) Int. Cl.

| *B60Q 3/60* | (2017.01) |
|---|---|
| *F21V 9/08* | (2018.01) |
| *F21V 15/01* | (2006.01) |
| *B60Q 3/74* | (2017.01) |
| *F21V 3/00* | (2015.01) |
| *F21Y 113/13* | (2016.01) |
| *F21V 25/12* | (2006.01) |
| *F21Y 115/10* | (2016.01) |
| *F21S 43/243* | (2018.01) |
| *F21S 43/30* | (2018.01) |
| *F21S 43/31* | (2018.01) |
| *F21S 43/40* | (2018.01) |

(52) U.S. Cl.
CPC ............ *F21V 15/01* (2013.01); *F21V 23/004* (2013.01); *F21S 43/243* (2018.01); *F21S 43/30* (2018.01); *F21S 43/31* (2018.01); *F21S 43/315* (2018.01); *F21S 43/40* (2018.01); *F21V 3/00* (2013.01); *F21V 25/12* (2013.01); *F21Y 2113/13* (2016.08); *F21Y 2115/10* (2016.08)

(58) Field of Classification Search
CPC . F21V 15/01; F21V 25/12; F21V 7/04; B60Q 3/60
See application file for complete search history.

(56) References Cited

U.S. PATENT DOCUMENTS

| 2004/0208019 | A1 | 10/2004 | Koizumi et al. | |
| 2008/0049438 | A1* | 2/2008 | Bloemen | B60Q 1/0052 |
| | | | | 362/540 |
| 2009/0296416 | A1* | 12/2009 | Luo | F21K 9/00 |
| | | | | 362/487 |
| 2011/0058353 | A1 | 3/2011 | Yang | |
| 2011/0096544 | A1 | 4/2011 | Nakamura | |
| 2014/0085918 | A1 | 3/2014 | Muller et al. | |
| 2016/0091170 | A1* | 3/2016 | Watanabe | F21V 7/06 |
| | | | | 362/231 |
| 2018/0245774 | A1* | 8/2018 | Kang | F21V 7/04 |

FOREIGN PATENT DOCUMENTS

| JP | H11-185517 A | 7/1999 |
| JP | H11-306810 A | 11/1999 |
| JP | 2001-281425 A | 10/2001 |
| JP | 2009-067098 A | 4/2009 |
| JP | 2010-087312 A | 4/2010 |
| JP | 2011-65946 A | 3/2011 |
| JP | 2013-502042 A | 1/2013 |
| JP | 2013-545662 A | 12/2013 |
| WO | WO-2010/001604 A1 | 1/2010 |

OTHER PUBLICATIONS

International Search Report issued in PCT Patent Application No. PCT/JP2016/077676 dated Dec. 6, 2016.
Decision to Grant a Patent issued in Japanese Patent Application No. 2015-184351 dated Jun. 28, 2018.

* cited by examiner

LED LIGHTING DEVICE, AND METHOD OF EXTRACTING LIGHT USING LED LIGHTING DEVICE

TECHNICAL FIELD

The present invention relates to an LED lighting device that is compact and capable of uniformly irradiating different regions, respectively, and relates to method of extracting light using the LED lighting device.

BACKGROUND

An LED (Light Emitting Diode) lighting has become widely used because the LED lighting is energy saving and has a longer operating life, and a number of lighting devices using the LED have been so far proposed. One of those lighting devices is a device in which a light reflector plate is arranged inside a frame of the lighting device and light is diffused and reflected to emit in order to improve an illuminance of the lighting device and to diffuse light.

For example, a certain reflector plate has been proposed that is inclined such that the reflector plate gets closer toward a light extraction portion as going farther from a light source (International Publication of PCT International Application No. WO2010-001604).

Also, a certain shape of a reflector plate has been proposed in which the reflector plate is formed in a curved shape for surface emitting (Japanese Patent Application Laid-Open Publication No. 2013-545662).

Yet also, as a method for extracting light, a certain method has been proposed in which a commonly-used diffusion sheet having a fine unevenness is stuck to an outer lens for extracting light (Japanese Patent Application Laid-Open Publication No. 2009-67098).

Yet also, a certain method has been proposed in which light from an LED light source is extracted after the light is multiply reflected in a light guide space having a curved shape (Japanese Patent Application Laid-Open Publication No. 2013-502042).

Yet also, a certain lighting device having a double layer structure has been proposed in which light sources are arranged in upper and lower two stages (Japanese Patent Application Laid-Open Publication No. Hei 11-185517).

However, the reflector plate disclosed in International Publication of PCT International Application No. WO2010-001604 is formed by laminating a PET film or white ink having light reflectivity on a metal or resin member, and therefore it is difficult to efficiently diffuse and reflect light.

According to Japanese Patent Application Laid-Open Publication No. 2013-545662, as the reflector plate is separately provided from a supporting structure such as a board or the like to which the LED light source is attached, and therefore the number of components increases and a configuration becomes complex.

The methods disclosed in Japanese Patent Application Laid-Open Publication No. 2009-67098 and Japanese Patent Application Laid-Open Publication No. 2013-502042 merely multiply reflect light from the LED light source by the diffusion sheet or the reflector plate and are not necessarily efficient. For example, when trying to extract uniformed light with a small number of LED light sources, it is required to provide a wider diffuse reflection area. Thus, in a case that an irradiation area is partitioned into a plurality of irradiation areas and light is to be extracted from the respective irradiation areas, it is required to provide a wider diffuse reflection area for each of the irradiation areas with respect to all irradiation areas. For this reason, the lighting device becomes enlarged.

In addition, as the lighting device is arranged inside an illumination space and thus a board of the lighting device adversely absorbs return light of the illumination light, which is emitted from the light source and then reflected by a reflecting surface, the use efficiency of the light is lowered. Also, as the LED board absorbs the light and is heated, it is concerned to shorten the operating life of the light source. Furthermore, as the LED is used as the light source and thus heat from the LED light source is transferred to a switch, a switch portion becomes heated so as to deteriorate the ease of use. Also, when used as an automotive interior illumination, it is in particular undesirable because the heat of the LED light source is radiated in an interior of the vehicle through the switch.

As a molded component of a highly reflective resin material such as a highly reflective polycarbonate or the like is used for a frame, the lighting device becomes heavy.

In Japanese Patent Application Laid-Open Publication No. Hei 11-185517, as the LED light sources are arranged in a staggered layout, it requires a number of LED light sources, and therefore the number of components increases and a configuration becomes complex.

SUMMARY OF THE DISCLOSURE

The present invention has been in view of the above-mentioned circumstance and an object thereof is to provide an LED lighting device that is simplified configuration and compact and capable of uniformly irradiating different regions, respectively, and to provide method of extracting light using the LED lighting device.

In order to achieve the above-mentioned object, according to a first aspect of the invention, there is provided an LED lighting device that includes: an outer frame made of microcellular foam resin; and an inner frame arranged inside the outer frame and made of the microcellular foam resin. Both of the inner frame and the outer frame have openings provided at respective upper portions and recess portions formed downwardly from the openings, respectively. The recess portions of the inner frame and the outer frame are spaced apart from and face each other. A surface side of the inner frame functions as a reflector plate, and a space surrounded by the surface side of the inner frame and the opening of the inner frame forms a first light guide space. A rear face side of the inner frame and a surface side of the outer frame function as reflector plates, respectively, and a space surrounded by a rear face side of the inner frame, the surface side of the outer frame, and the openings of the inner frame and the outer frame forms a second light guide space. The opening of the inner frame serves as a first light extraction portion. An opening formed around the first light extraction portion and surrounded by the openings of the inner frame and the outer frame serves as a second light extraction portion. The opening(s) of the inner frame is formed on a substantially same plane. The opening of the outer frame and the opening of the inner frame are formed on a same plane, or alternatively, the opening of the outer frame is arranged behind the opening of the inner frame. A first LED light source is arranged in the first light guide space and a second LED light source is arranged in the second light guide space.

The LED lighting device may further include a light transmissive member having a first light transmissive portion and a second light transmissive portion. The light transmissive member may have a structure in which the first light extraction portion is covered by the first light transmissive portion and the second light extraction portion is covered by the second light transmissive portion. The opening of the inner frame and the opening of the outer frame may be formed on a same plane, and the first light extraction portion and the second light extraction portion may be formed on a same plane. A vicinity of an edge of the opening of the inner frame and a vicinity of an edge of the opening of the outer frame may both contact the light transmissive member. The vicinity of the edge of the opening of the inner frame may be fixed (secured) to the first light transmissive portion, and the vicinity of the edge of the opening of the outer frame may be fixed to the second light transmissive portion.

The LED lighting device may further include a light transmissive member having a first light transmissive portion and a second light transmissive portion. The light transmissive member may have a structure in which the first light extraction portion is covered by the first light transmissive portion and the second light extraction portion is covered by the second light transmissive portion. The opening of the outer frame may be arranged behind the opening of the inner frame. A vicinity of an edge of the opening of the inner frame and a vicinity of an edge of the opening of the outer frame may both contact the light transmissive member. The vicinity of the edge of the opening of the inner frame may be fixed to the first light transmissive portion, and the vicinity of the edge of the opening of the outer frame may be fixed to the second light transmissive portion.

A front edge of the inner frame may be bent in a flange shape in an outer circumferential direction of the inner frame along the first light extraction portion, and a front edge of the outer frame may be bent in the flange shape in an outer circumferential direction of the outer frame in substantially parallel to a reflector plate of the flange shape of the inner frame.

The first LED light source may be arranged on a surface side of the inner frame in the first light guide space, and the second LED light source may be arranged on either a rear face side of the inner frame or a surface side of the outer frame in the second light guide space. The LED light source may be arranged at a position that is invisible from the second light extraction portion.

The inner frame may have one or two said recess portion (s), and one said first LED light source may be arranged in each of the recess portion(s) corresponding to a number of the recess portions.

When the inner frame has one said recess portion, the first LED light source may be arranged at a wall portion of the recess portion of the inner frame.

When the inner frame has one said recess portion, the first LED light source may be arranged in substantially center of a curved face portion of the recess portion of the inner frame.

When the inner frame has two said recess portions, the inner frame may include two independent openings provided at an upper portion thereof and the recess portions formed downwardly from the two openings, respectively. The first LED light sources may be arranged at respective wall portions, which are located on a substantially same plane, of the two recess portions of the inner frame, with light emitting faces being directed in a same direction.

When the inner frame has two said recess portions, the inner frame may include two independent openings provided at an upper portion thereof and the recess portions formed downwardly from the two openings, respectively. The first LED light sources may be arranged at respective wall portions of the two recess portions of the inner frame, with light emitting faces being directed in an opposite direction each other.

When the inner frame has two said recess portions, the inner frame may include two independent openings provided at an upper portion thereof and the recess portions formed downwardly from the two opening parts, respectively. The first LED light sources may be arranged in substantially centers of curved face portions of the respective recess portions of the inner frame, respectively.

At least one or more said second LED light sources may be arranged in a substantially center of the second light guide space.

Shapes of the recess portions of the inner frame and the outer frame may each has a wall portion formed downwardly and substantially perpendicular to the first light extraction portion, and any one of a curved face shape having a curved face portion opening upwardly, a substantially truncated pyramid shape, and a substantially cuboid shape.

The outer frame may be formed integrally with the inner frame, or integrated after being formed separately. For example, the inner frame and the outer frame may be separately formed, and may be integrated by adhesion in at least part of a hinge portion.

The inner frame and the outer frame may be integrated with a hinge portion, and the recess portions of both of the inner frame and the outer frame may be spaced part from each other and stacked with the hinge portion being bent.

On one face of opposing portions of the inner frame and the outer frame, a protrusion portion protruding toward an opposing face or a pillar portion joining the inner frame to the outer frame may be formed. The protrusion portion may be configured to abut the opposing face or the pillar portion is configured to connect the inner frame to the outer frame, whereby an arrangement of the inner frame and the outer frame may be stabilized.

The inner frame and the outer frame formed separately may be arranged to be spaced apart from each other. Further, on one face of opposing portions of the inner frame and the outer frame, a protrusion portion protruding toward an opposing face or a pillar portion joining the inner frame to the outer frame may be formed. The protrusion portion and the pillar portion are configured to connect the inner frame to the outer frame so as to form the second light extraction portion in an entire outer circumference of the inner frame when the inner frame is arranged inside the outer frame, whereby light is capable of being extracted from the entire outer circumference of the inner frame.

The inner frame and the outer frame formed separately may be arranged to be spaced apart from each other. Vicinities of frond edges of the openings of the inner frame and the outer frame may be fit into grooves formed in a light transmissive member to be supported therewith, respectively, so as to form the second light extracting portion in an entire circumference of the inner frame when the inner frame is arranged inside the outer frame, whereby light is capable of being extracted from the entire outer circumference of the inner frame.

The inner frame and the outer frame formed separately may be arranged to be spaced apart from each other. Vicinities of frond edges of the inner frame and the outer frame may be fit into frame members to be supported therewith, respectively, so as to form the second light extracting portion in an entire outer circumference of the inner frame when the inner frame is arranged inside the outer frame, whereby light is capable of being extracted from the entire outer circumference of the inner frame.

A light diffusion layer or a lens structure may be provided on either a face at a light guide space side of the light transmissive member or an opposite face to the light guide space side.

The lens structure may be a structure in which a surface or a rear face of the light transmissive member, which covers the first light extraction portion, is formed in a number of prism shapes, or a prism sheet on which a number of prisms are formed is stuck to the light transmissive member.

A light transmission preventive member may be provided on a rear face of the light transmissive member immediately above the first LED light source so as to close a part of the first light extraction portion to shield direct irradiation light from the first LED light source.

The light transmission preventive member may be a resin sheet made of microcellular foam resin having light reflectivity.

The light transmissive member may be provided such that a thickness of the light transmissive member provided at the first light extraction portion is made thicker than a thickness of the other part of the light transmissive portion immediately above the first LED light source so as to attenuate direct irradiation light from the first LED light source.

The inner frame and the outer frame may have, as an optical property in a visible light band within a wavelength ranging from 450 nm to 650 nm, total reflectivity equal to or greater than 90% and diffuse reflectivity equal to or greater than 90% in terms of light reflectivity with respect to an aluminum oxide standard plate, respectively.

The inner frame and the outer frame may have wavelength dependency of the light reflectivity in the visible light band equal to or less than 2%, and preferably equal to or less than 1%.

The first LED light source may be a white or light yellow colored LED light source, and the second LED light source may be a colored LED light source of any of decorative red, yellow, green and blue colors, or an illumination capable of switching and using among red, green and blue colors.

A ratio of illuminance of light from the inner frame to illuminance of light from the outer frame may be 1.5 to 3.0.

The light transmissive member may be any one of an acrylic resin, a PC resin, a glass material, and a resin sheet made of polyester.

An illumination may be capable of being switched to be used between the first LED light source and the second LED light source by switching a selector switch.

A selector switch may be provided outside of the outer frame, and an illumination may be capable of being switched to be used between the first LED light source and the second LED light source by switching the selector switch.

Switching of respective illumination of two said inner frames may be performed by a contact type capacitance switch.

A controller board configured to control the first LED light source and the second LED light source may be provided, and the controller board may be a rigid board.

The LED lighting device may be for an ambient illumination use, an interior illumination use, an automotive illumination use, a rail vehicle use, or an aircraft illumination use.

According to the first aspect of the invention, the inner frame and the outer frame function as reflector plates made of microcellular foam resin, respectively, and therefore it is not required to constitute a frame and a reflector plate separately. For this reason, it makes it possible to reduce the number of components. Also, by employing a reflector plate made of the microcellular foam resin, it makes it possible to diffuse and reflect light efficiently. For this reason, it makes it possible to extract light with light absorption being reduced and illuminance being uniformed.

The inner frame and the outer frame are spaced apart from each other and stacked, and therefore it is possible to form light guide spaces, formed independently from each other, on a surface side and a rear face side of the inner frame. In other words, in the first light guide space on a surface side of the inner frame, light is diffused and reflected on the surface side of the inner frame, and therefore it is possible to make light from the first light extraction portion be unified. Likewise, in the second light guide space on a rear face side of the inner frame, light is diffused and reflected on a rear face side of the inner frame and a surface side of the outer frame, and therefore it is possible to make light from the second light extraction portion be unified, which is formed at a different region from the first light extraction portion.

As described above, by constituting the light guide spaces as a multi-layered structure, it makes it possible to form a diffuse reflection region in the second light guide space on a rear face side of the first light guide space so that a lighting device can be downsized. Also, it makes it possible to constitute a lighting device that has a double layered frame in which the inner frame and the outer frame are spaced apart each other at a prescribed distance.

The first light extraction portion and the second light extraction portion are covered by the light transmissive member, respectively, and therefore it is possible to prevent a foreign substance or the like from intruding inside thereof.

The first light extraction portion and the second light extraction portion are formed on a same plane, and therefore it is possible to switch between light from the second light extraction portion and light from a pair of the light extraction portions in a same direction so as to extract unified light beams in the same direction, respectively.

An opening of the outer frame is arranged behind an opening of the inner frame, and therefore, in particular, at least a part of the second light extraction portion is formed toward a different direction from the first light extraction portion so as to extract unified light beams in a different direction, respectively.

Reflector plates in a flange shape are provided at the outer frame and the inner frame, respectively, and both reflector plates are arranged substantially in parallel to the first light extraction portion, and therefore it is possible to prevent light from being extracted from the second light guide space in the direction of the first light extraction portion. Also, it makes it possible to improve the diffuse reflection property in the second light guide space. Further, it makes it possible to significantly reduce the sneaking of the light from the second light extraction portion toward the first light extraction portion through the first light transmissive portion. When an illumination color is changed differently between the first light extraction portion and the second light extraction portion, it makes it possible to prevent the colors being mixed even if simultaneously illuminated.

A shape of the light extraction portion can be adjusted by a flange shape of the frame, and therefore it is possible to freely adjust a shape of the light extraction portion or a gap between the light extraction portions so as to improve the functionality and design of the illumination. Also, by adjusting a size and an arrangement of the openings of the inner frame and the outer frame, it makes it possible to heighten a freedom in design of the first light extraction portion and the second light extraction portion of the lighting device such as a light irradiation direction or a size of the light extraction portion or the like.

The second LED light source is arranged at a position that is invisible from the second light extraction portion on either the rear face side of the inner frame or the surface side of the outer frame in the second light guide space, and therefore it is possible to reduce the glare so as to extract unified light from the second light extraction portion.

When the inner frame has one or two recess portion(s), the first LED light source is arranged in each of the recess portion(s), and therefore it is possible to allow the respective recess portions to function as independent light guide spaces, respectively.

When the inner frame has one recess portion, the first LED light source is arranged at a wall portion of the recess portion of the inner frame, and therefore it is possible to suppress light directly emitted from the first light extraction portion. Also, when the inner frame has one recess portion, the first LED light source is arranged in a curved face portion of the recess portion of the inner frame, and therefore it is possible to emit light toward the first light extraction portion.

When inner frame has two recess portions, the first LED light sources are arranged at respective wall portions of the two recess portions of the inner frame, with the light emitting faces thereof being directed in the same direction, and therefore it is possible to irradiate different irradiation regions with unified light beams, respectively. Also, when the inner frame has two recess portions, the similar advantages can be obtained even if the first LED light sources are arranged at respective wall portions of the two recess portions of the inner frame, with the light emitting faces thereof being directed in an opposite direction each other. Likewise, when the inner frame has two recess portions, the similar advantages can be obtained even if the first LED light sources are arranged at respective curved face portions of the two recess portions of the inner frame.

In this case, two inner frames are arranged together, and it makes it possible to allow two first light guide spaces to function independently from each other by respective inner frames. For this reason, it makes it possible to irradiate different irradiation regions with unified light beams, respectively.

One or more second LED light source(s) are arranged in a substantially center of the second light guide space, and therefore it is possible to extract substantially unified light from the second light extraction portion.

The recess portion has any of a curved face shape, a substantially truncated pyramid shape, and substantially cuboid shape, and therefore it is possible to apply to lighting devices in various shapes.

The inner frame and the outer frame are integrally formed, or integrated after being formed separately, and therefore fabrication is becomes easier.

In particular, the inner frame and the outer frame are formed integrally and bent with a hinge portion, and the recess portions of both of the inner frame and the outer frame are spaced apart from each other and stacked at a predetermined distance, and therefore it is possible to reduce the number of component. Also, a microcellular foam resin sheet is bent and used, and therefore it prevents the inner frame and the outer frame from contacting each other by the elastic repulsive force of the microcellular foam resin sheet.

On one face of opposing portions of the inner frame and the outer frame, a protrusion portion protruding toward an opposing face or a pillar portion joining the inner frame to the outer frame is formed, and therefore it is possible to maintain a gap between the inner frame and the outer frame in an assured manner. As a result, it makes it possible to stabilize an arrangement of the inner frame and the outer frame.

The inner frame and the outer frame, which are formed separately, are connected by the protrusion portion or the pillar portion, and therefore it is possible to arrange the inner frame and the outer frame to be spaced apart from each other so that the second light extraction portion can extract light from an entire outer circumference of the inner frame.

Vicinities of front edges of the openings of the inner frame and the outer frame, which are formed separately, are fit into the grooves formed in the light transmissive member to be supported therewith, respectively, and therefore it is possible to allow the inner frame and the outer frame to be spaced apart from each other so as to extract light from the entire outer circumference of the inner frame in an assured manner.

Vicinities of front edges of the openings of the inner frame and the outer frame, which are formed separately, are fit into the frame members to be supported therewith, respectively, and therefore it is possible to allow the inner frame and the outer frame to be spaced apart from each other so as to extract light from the entire outer circumference of the inner frame in an assured manner.

Furthermore, it is also possible to provide a light diffusion layer or a lens structure on either a face at the light guide space side or an opposite light extraction face of the light transmissive member. For example, a number of prism shapes may be formed on a surface or a rear face of the light transmissive member, or a prism sheet or the like in which a number of prisms are formed may be stuck to the light transmissive member.

A light transmission preventive member is arranged immediately above the first LED light source such that the light transmission preventive member closes a part of the light extraction portion and shields the direct irradiation light from the first LED light source, and therefore it is possible to reduce the glare.

The light transmission preventive member is made of a resin sheet made of microcellular foam resin, and therefore it makes it possible to diffuse and reflect light on the rear face of the light transmission preventive member effectively.

The thickness of the light transmissive member at an immediately above portion of the first LED light source is made thicker than the thickness of other part of the light transmissive member, and therefore it is possible to attenuate direct irradiation light from the first LED light source so as to reduce the glare.

When the light reflectivity in the visible light band is equal to or greater than 90%, then it makes it possible to be in conformity with illuminations of arbitrary colors. Also, even if a light path length from the light source to the opening has discrepancy, still it is possible to extract substantially unified light from the opening, because the light reflectivity is high. It is preferable if the light reflectivity in the visible light band is equal to or greater than 95%.

If the inner frame and the outer frame have a wavelength dependency of the reflectivity in a visible light band equal to or less than 2%, preferably 1%, respectively, then, it makes it possible to obtain illumination light in which the wavelength properties (emission spectral intensity distribution) of respective light sources are kept, even if the first LED light source and the second LED light source are visible light sources having different wavelength from each other.

Light from the first LED light source is, for example, a white or light yellow colored light, and therefore it is possible to use the light from the first light extraction portion as a practical illumination. Also, light from the second LED light source is colored illumination light that is differently colored from the light from the first LED light source, and therefore it is possible to use the light from the second light extraction portion for, for example, a decorative illumination.

When a ratio of the illuminance of the light from the inner frame to the illuminance of the light from the outer frame is 1.5 to 3.0, then it makes it possible to allow the illuminance for the interior illumination to be higher with respect to the decorative illumination. By doing this, it makes it possible to design the illuminance for the interior illumination to the illuminance for the practical interior illumination, and to use the light from the outer frame as the ambient illumination or an auxiliary illumination having a low illuminance.

Various materials can be applied to the light transmissive member.

By switching the selector switch, it makes it possible to switch and use the illumination between the first LED light source and the second LED light source.

Switching the illumination of respective two inner frames is performed by a contact type capacitance switch, and therefore an operation becomes easier.

A rigid board such as a glass epoxy substrate or the like is used for the controller board, and therefore it is possible to be of help for improving the rigidity of the board or the strength of the lighting device.

The lighting device according to the present invention is preferable for, in particular, a lighting device for an ambient illumination use, an interior illumination use, an automotive illumination use, a rail vehicle use, or an aircraft illumination use.

According to a second aspect of the invention, there is provided method of extracting light using an LED lighting device, the LED lighting device including: an outer frame made of microcellular foam resin; and an inner frame arranged together inside the outer frame and made of the microcellular foam resin, both of the inner frame and the outer frame having openings provided at respective upper portions and recess portions formed downwardly from the openings, respectively, the recess portions of the inner frame and the outer frame being spaced apart from and face each other, a surface side of the inner frame functioning as a reflector plate, a space surrounded by the surface side of the inner frame and the opening of the inner frame forming a first light guide space, a rear face side of the inner frame and a surface side of the outer frame functioning as reflector plates, respectively, a space surrounded by a rear face side of the inner frame, the surface side of the outer frame, and the openings of the inner frame and the outer frame forming a second light guide space, the opening of the inner frame serving as a first light extraction portion, an opening formed around the first light extraction portion and surrounded by the openings of the inner frame and the outer frame serving as a second light extraction portion, the opening of the inner frame being formed on a substantially same plane, the opening of the outer frame and the opening of the inner frame being formed on a same plane, or alternatively the opening of the outer frame being arranged behind the opening of the inner frame, and the method including: extracting, from the first light extraction portion, light in an opening face direction of the opening of the inner frame, and extracting, from the second light extraction portion, light in an opening face direction of the opening of the inner frame, or in a direction including either an opening face direction of the opening of the inner frame or a side face direction intersecting therewith at a predetermined angle.

In the method of extracting light using the LED light lighting device, the first LED lighting source may be arranged on a surface side of the inner frame in the first light guide space, and the second LED lighting source may be arranged on either a rear face side of the second light guide space or a surface side of the outer frame in the second light guide space, and the second LED light source may be arranged at a position that is invisible from the second light extraction portion.

The inner frame may have one or two said recess portion (s), and one said first LED light source may be arranged in each of the recess portion(s) corresponding to a number of the recess portions.

The first light extraction portion and the second light extraction portion may be both covered by a light transmissive member, the light transmissive member may have a first light transmissive portion and a second light transmissive portion, the first light extraction portion may be covered by the first light transmissive portion, the second light extraction portion may be covered by the second light transmissive portion. The first light transmissive portion may extract light in an opening face direction of the opening of the inner frame, and the second light transmissive portion may extract light in the opening face direction of the opening of the inner frame, or in a direction including at least either the opening face direction of the opening of the inner frame or a side face direction intersecting therewith at a predetermined angle.

The inner frame and the outer frame may be arranged to be spaced apart from each other, and when the inner frame is arranged inside the outer frame, the second light extraction portion may be formed in an entire outer circumference of the inner frame, whereby light is extracted from the entire outer circumference of the inner frame.

The inner frame and the outer frame may have, as an optical property in a visible light band within a wavelength ranging from 450 nm to 650 nm on respective surfaces thereof, diffuse reflectivity equal to or greater than 90% with respect an aluminum oxide standard plate.

According to the second aspect of the invention, the inner frame and the outer frame function as reflector plates made of microcellular foam resin, respectively, and therefore it is not required to constitute a frame and a reflector plate separately. For this reason, it makes it possible to reduce the number of components. Also, by employing a reflector plate made of the microcellular foam resin, it makes it possible to diffuse and reflect light efficiently. For this reason, it makes it possible to extract light with light absorption being reduced and illuminance being uniformed. The second LED light source is arranged at a position that is invisible from the second light extraction portion, and therefore it is possible to allow the light extracted from the second light extraction portion to be uniformed and without the glare.

The LED light sources are arranged corresponding to the number of the recess portions of the inner frame, and therefore it is possible to irradiate a target position with light. The light extraction portion is covered by the light transmissive member, and therefore it is possible to prevent a foreign substance or the like from intruding inside thereof.

The inner frame and the outer frame are arranged to be spaced apart from each other, and the second light extraction portion is formed in an entire outer circumference of the inner frame, and therefore it is possible to extract light from the entire outer circumference of the inner frame.

When the light reflectivity in the visible light band is equal to or greater than 90%, then it makes it possible to deal with an illumination of arbitrary colors.

According to the present invention, it makes it possible to provide an LED lighting device that is simplified structure and compact, and is capable of uniformly irradiating different regions, respectively.

BRIEF DESCRIPTION OF THE DRAWINGS

FIG. 5 is a plan view showing an LED lighting device 1a.

DETAILED DESCRIPTION

First Embodiment

Figure 1:
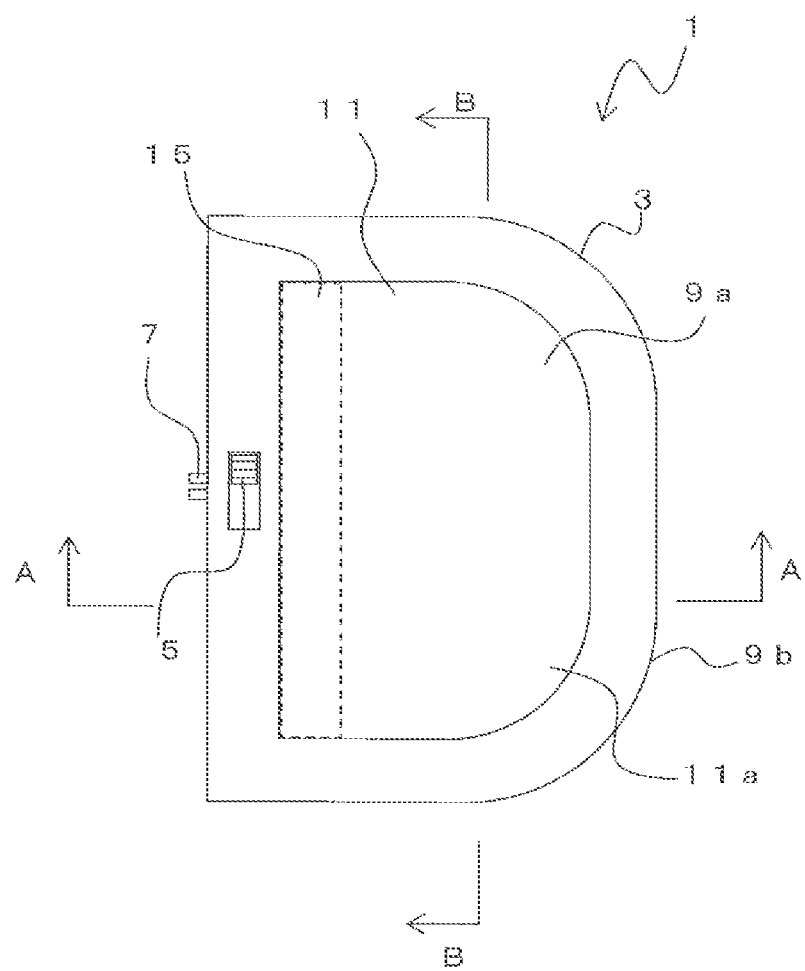
FIG. 1 is a plan view showing an LED lighting device 1.
Figure 2:
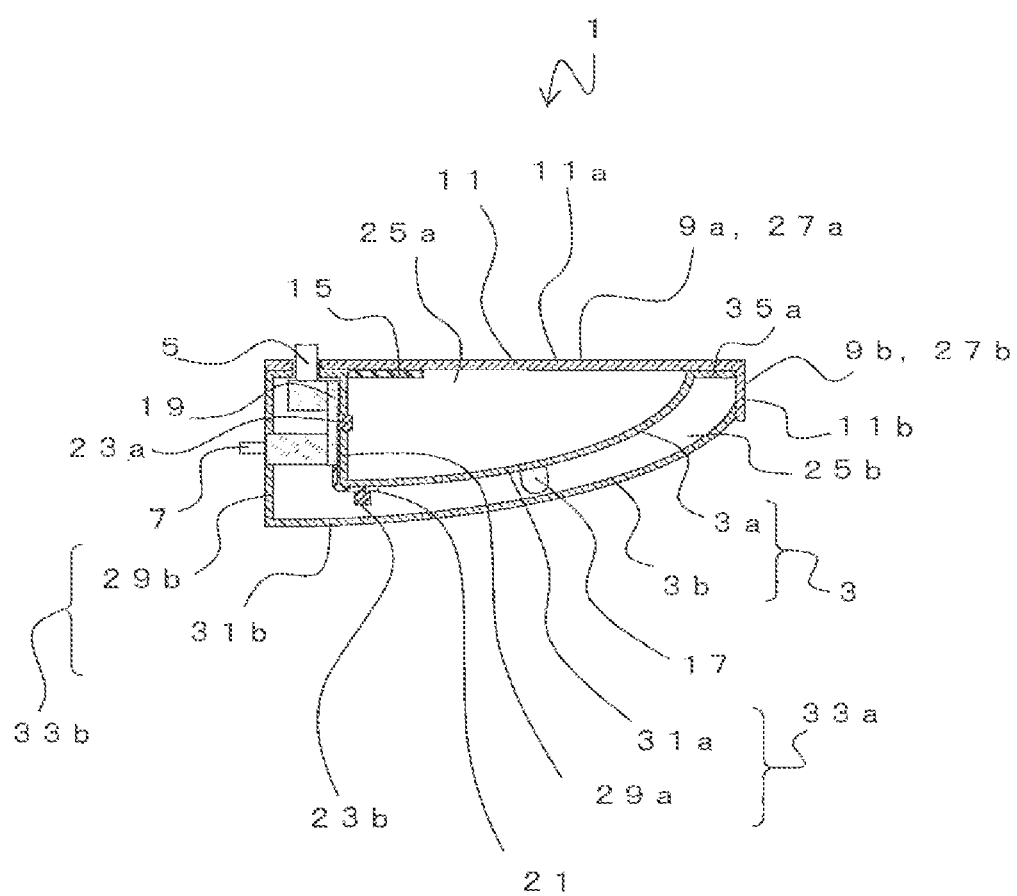
FIG. 2 is a cross-sectional view of the LED lighting device 1 taken along the line A-A in FIG. 1.
Figure 3:
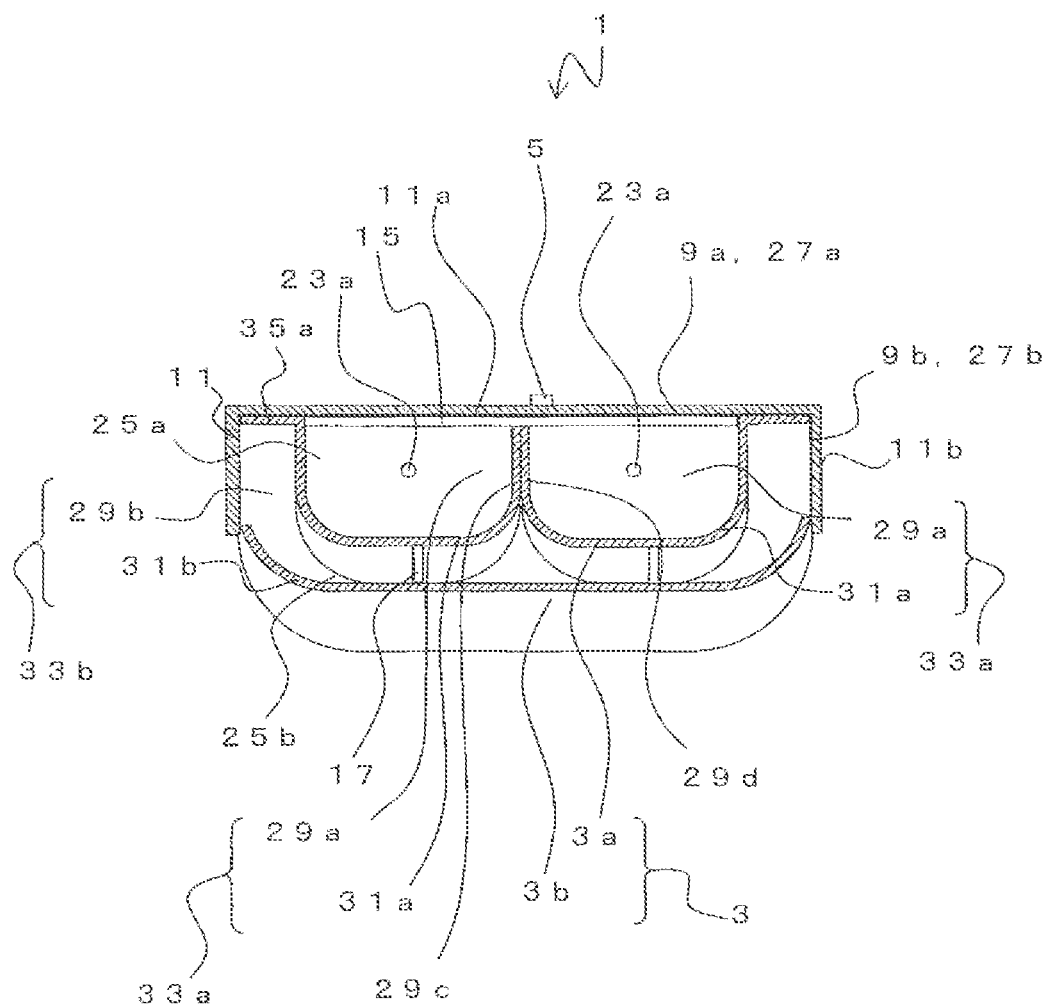
FIG. 3 is a cross-sectional view of the LED lighting device 1 taken along the line B-B in FIG. 1.

Hereinafter, embodiments of the present invention will be described with reference to the accompanying drawings. FIG. 1 is a plan view showing an LED lighting device 1. FIGS. 2 and 3 are cross-sectional views of the LED lighting device 1. FIG. 2 is a cross-sectional view of the LED lighting device 1 taken along the line A-A in FIG. 1. FIG. 3 is a cross-sectional view of the LED lighting device 1 taken along the line B-B in FIG. 1.

The LED lighting device 1 includes, as its major components, a frame 3, a light transmissive member 11, LED light sources 23a and 23b, and a selector switch 5 or the like.

The frame 3 has an outer frame 3b made from microcellular foam resin, and an inner frame 3a made from the microcellular foam resin in which two recess portions are provided to be spaced apart from each other. The two recess portions of the inner frame 3a are arranged together inside the outer frame 3b. In other words, the frame 3 has a dual structure. It should be noted that the frame 3 may be made of any other materials that have a higher light reflectivity, hardly transmit light, and have a shape retention property.

The inner frame 3a and the outer frame 3b have openings 27a and 27b provided at respective upper portions, and recess portions 33a and 33b formed downwardly from the openings 27a and 27b, respectively. More particularly, respective recess portions 33a and 33b of the inner frame 3a and the outer frame 3b have wall portions 29a and 29b, which are formed at a prescribed angle from the respective openings 27a and 27b, and curved face portions 31a and 31b, which curve from lower ends of the wall portions 29a and 29b and then extend toward the openings 27a and 27b in an obliquely upward direction in FIG. 2, respectively.

As shown in FIG. 3, respective opposing faces of the two recess portions of the inner frame 3a serve as the wall portions 29c and 29d, respectively. In other words, two recess portions of the inner frame 3a are situated adjacent to each other as substantially symmetric two frame bodies with the wall portions 29c and 29d being a boundary.

Respective opening portions 27a of the two recess portions 33a of the inner frame 3a are being partitioned into two regions by the wall portions 29c and 29d, and the partitioned regions are formed on a substantially same plane. In this way, in the LED lighting device 1, the inner frame 3a is a frame having symmetric two recess portions 33a, and the two recess portions are adjacent and facing to each other, and arranged independently from each other. It should be noted that a pair of recess portions 33a of the inner frame 3a are adhered to each other at the wall portions 29c and 29d and integrated into the inner frame 3a. It should also be noted that "integrated" may mean either integrally formed during the manufacturing process, or joined and integrated after being formed separately.

It should be noted that in the LED lighting device 1, for example, the inner frame 3a, which is formed with two separate bodies, may be as is used without joining with the wall portions 29c and 29d directly facing to each other. However, it is preferable to partition one inner frame 3a into substantially symmetric two compartments by a partitioning wall to constitute two light guide spaces 25a inside the same inner frame 3a, or alternatively to integrally form the inner frame having two recess portions by way of the vacuum forming or the matched molding forming or the like. In this case, the partitioning portion serves as a wall portion in place of the wall portions 29c and 29d.

It should be noted that shapes of the inner frame 3a and the outer frame 3b are not limited to those illustrated in the drawings. For example, each of the shapes of the inner frame 3a and the outer frame 3b may be a substantially truncated pyramid sectional shape or a substantially cuboid shape instead of the curved face shape as shown in the drawings. In other words, shapes of the recess portions 33a and 33b of the inner frame 3a and the outer frame 3b may suffice as long as each of the recess portions has, for example, each of the wall portions 29a, 29b, 29c and 29d, which is formed downwardly and substantially perpendicular to the light transmissive portion 11a, and any one of the curved face shape having the curved face portion opening upwardly, the substantially truncated pyramid shape, and the substantially cuboid shape.

The wall portions 29a and 29b are formed at a prescribed angle from the opening portions 27a and 27b, respectively. For example, the wall portions 29a and 29b may be formed substantially perpendicular to the opening portions 27a and 27b, respectively, or alternatively formed to have an obtuse angle to the opening portions 27a and 27b. Also, the wall portions 29c and 29d are formed perpendicular to the opening portions 27a, and for example, the wall portions 29c and 29d are substantially orthogonal to the wall portion 29a.

Here, "the wall portions 29a and 29b being formed to have the obtuse angle to the respective openings 27a and 27b" means, observing from the respective light guide spaces 25 a and 25b, angles between the openings 27a and 27b and the wall portions 29a and 29b are the obtuse angle, respectively. For example, by setting the wall portion 29a to have the obtuse angle to the opening 27a, it makes it possible to allow the LED light source 23a to be invisible from immediately above portion. By doing this, it makes it possible to reduce the direct irradiation light from the LED light source and reduce the glare.

The respective recess portions 33a and 33b of the inner frame 3a and the outer frame 3b are arranged to be spaced apart from and face to each other. Hereinafter, in the following description, the each of sides of the openings 27a and 27b of the inner frame 3a and the outer frame 3b is referred to as "surface side" of each of the respective frames, and an opposite face side is referred to as "rear face side." In other words, the surface side of the inner frame 3a opposes the opening 27a, and the rear face side of the inner frame 3a opposes the surface side of the outer frame 3b.

The surface side of the inner frame 3a functions as a reflector plate. Thus, a space surrounded by the surface side of the inner frame 3a and the opening 27a (a light transmissive portion 11a, which will be described later) constitutes a first light guide space 25a. Similarly, the rear face side of the inner frame 3a and the surface side of the outer frame 3b function as reflector plates, respectively. Thus, a space surrounded by the rear side face of the inner frame 3a, the surface side of the outer frame 3b and the opening 27b (a light transmissive portion 11b, which will be described later) constitutes a second light guide space 25b. In other words, both sides of the inner frame 3a function as the reflector plates, respectively.

Protrusion portions 17 are provided on the rear face side of the recess portions 33a of the inner frame 3a, respectively. Each of the protrusion portions 17 protrudes to the surface side of the outer frame 3b, which opposes the rear face side of the inner frame 3a, and a front edge of the protrusion portion 17 contacts the outer frame 3b. By doing this, respective recess portions 33a of the inner frame 3a are supported by the outer frame 3b, respectively, and therefore it is possible to prevent the light guide space 25b from being crushed so as to stabilize the clearance in the layout of the inner frame 3a and the outer frame 3b and to increase the rigidity of the lighting device.

It should be noted that the protrusion portion 17 may be formed on either the rear face side of the inner frame 3a or the surface side of the outer frame 3b in the light guide space 25b. In other words, on one face of opposing portions of the inner frame 3a and the outer frame 3b, the protrusion portion 17 protruding toward an opposing face may be formed. In this case, the protrusion portion 17 protruding in the opposing direction abuts on the opposing rear face of the inner frame 3a or the opposing surface of the outer frame 3b. Also, the protrusion portion 17 may be formed separately from the inner frame 3a and the outer frame 3b, and joined to the rear face side of the inner frame 3a or the surface side of the outer frame 3b. The protrusion portion 17 may be formed integrally with the inner frame 3a or the outer frame 3b by deforming a part of the inner frame 3a or the outer frame 3b.

Instead of the protrusion portion 17, a pillar portion joining the inner frame 3a to the outer frame 3b may be formed. In this case, the pillar portion connects the inner frame 3a to the outer frame 3b, respectively. By doing this, it makes it possible to stabilize an arrangement of the inner frame 3a and the outer frame 3b.

It should be noted that, in order to reduce the light being shielded by the protrusion portion 17 or the pillar portion, it is preferable to form the protrusion portion 17 or the pillar portion itself as small as possible, as long as the clearance between the inner frame 3a and the outer frame 3b is controlled and a prescribed light guide space are assured. In this case, even if the light from the light source is shielded by the protrusion portion 17 or the pillar portion, the light shielded by the protrusion portion 17 or the pillar portion is reflected by the protrusion portion 17 or the pillar portion, and the reflected light is then diffused and reflected on the rear face of the inner frame 3a or the surface of the outer frame 3b. As a result, it makes it possible to extract the reflected light from a second light guide space, which will be described in the following description.

Here, as described above, the inner frame 3a and the outer frame 3b are formed with a microcellular foam resin sheet (a porous material having a number of microstructure). The microcellular foam resin sheet used in the present invention is a resin sheet having a foamed layer in the center and non-foamed layers on both surfaces. Here, the foamed layer means a layer in which gas bubbles are generated by foaming.

According to this embodiment, the thickness of the microcellular foam resin sheet is 0.4 mm to 2.0 mm, and the thickness of the non-foamed layer on the surface is 10 μm to 30 μm. Also, the microcellular foam resin sheet according to the present invention has preferably an average gas bubble diameter within a range between 0.2 μm to 40 μm. When the average gas bubble diameter is less than 0.2 μm, then the light permeability rate becomes too high and the light reflectivity is lowered. On the other hand, when the average gas bubble diameter is too large, the diffuse reflectivity is lowered. Accordingly, the average gas bubble diameter is required to be between 0.2 μm to 40 μm. Furthermore, the average gas bubble diameter is preferably between 0.5 μm to 20 μm.

As an optical property of the inner frame 3a and the outer frame 3b made of the microcellular foam resin in the visible light band having a wavelength ranging from 450 nm to 650 nm, the light reflectivity when using the aluminum oxide standard plate is preferable to satisfy the total reflectivity equal to or greater than 90%, the diffuse reflectivity equal to or greater than 90%, and the wavelength dependency of the reflectivity equal to or less than 2%, more preferably equal to or less than 1%. Both the total reflectivity and the diffuse reflectivity preferably satisfy equal to or greater than 95%, and possibly equal to or greater than 99%. It should be noted that the optical property with respect to the visible light having the wavelength ranging from 450 nm to 650 nm does not greatly vary between the microcellular foam resin before being formed and the inner frame 3a and the outer frame 3b after being formed.

Here, the microcellular foam resin sheet according to the present invention has an insulation property, and a volume specific resistance thereof is between $10^{12}\Omega$ and $10^{17}\Omega$. Within this range, it makes it possible to assure the insulation property in the present invention sufficiently.

Also, according to this embodiment, the microcellular foam resin sheet is preferably constituted by any one of a PET resin (polyethylene terephthalate resin), a PC resin (polycarbonate resin), a flame retardant PC resin, an acrylic resin, for example, a PMMA resin (polymethylmethacrylate resin). In addition to the above, the microcellular foam resin sheet may use a transparent resin in which the flame retardant property is applied to an acrylic resin such as cycloolefin polymer, polyacrylonitrile or the like. Depending on a use place or the intended use, the microcellular foam resin sheet to which an antistatic, a flame retardant applying, or an ultra violet resisting coating or the like is applied may be used.

Figure 4A:
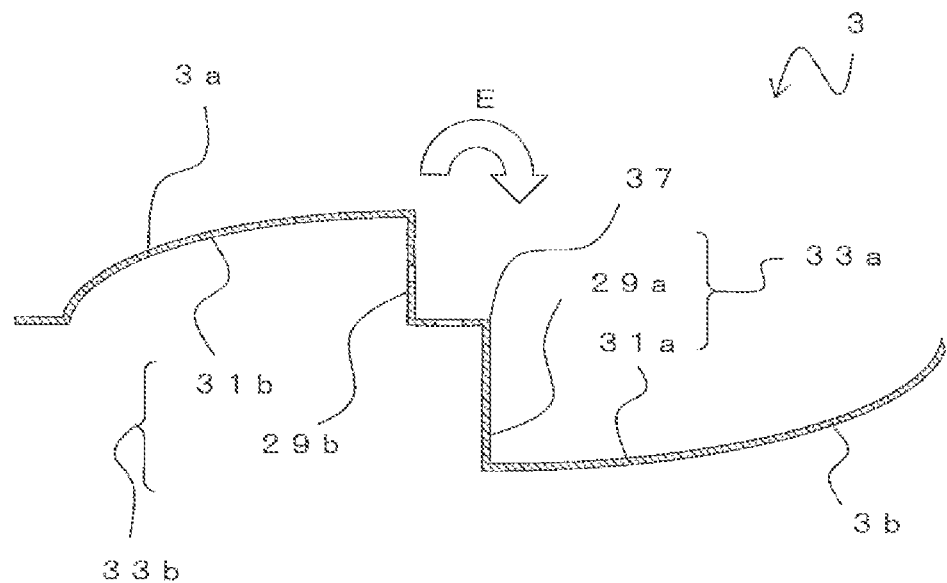
FIG. 4A is a view showing a manufacturing process of a frame 3.
Figure 4B:
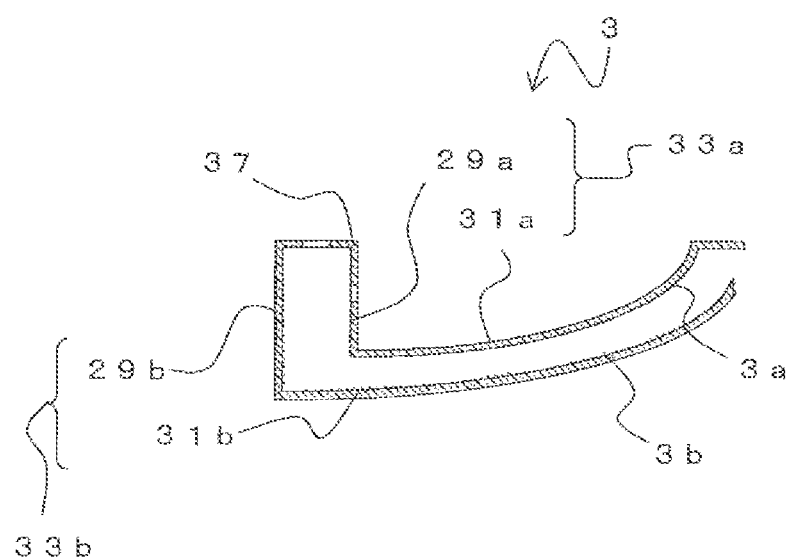
FIG. 4B is a view showing a manufacturing process of a frame 3.

The inner frame 3a and the outer frame 3b can be integrally formed by the vacuum forming or the matched molding forming to the microcellular foam resin sheet. FIGS. 4A and 4B are views showing exemplary manufacturing processes of the frame 3, respectively.

For example, the thermoplastic microcellular foam resin sheet such as the PET resin, the PC resin, the flame retardant PC resin, or the acrylic resin is heated and soften by a heater, and the soften microcellular foam resin sheet is suctioned into a forming die. Thus, the inner frame 3a and the outer frame 3b can be integrally formed through a hinge portion 37 serving as a boundary portion. Here, in the microcellular foam resin sheet after the heat forming such as the vacuum forming or the matched molding forming, the optical property such as the total reflectivity or the diffuse reflectivity or the like hardly varies between before heating and after heating, and is able to satisfy the total reflectivity and the diffuse reflectivity equal to or greater than 90%.

An integrally formed component obtained in this ways is bent at the hinge portion 37, serving as the boundary portion, between the pair of inner frame 3a and the outer frame 3b (as shown by an arrow C in the drawings), the inner frame 3a and the outer frame 3b are stacked so as to obtain the frame body 3. It should be noted that, as described above, the protrusion portion 17 may be joined between the inner frame 3a and the outer frame 3b. Also, the protrusion portion 17 may be integrally formed with the inner frame 3a and/or the outer frame 3b by way of the vacuum forming or the matched molding forming.

It should be noted that the inner frame 3a and the outer frame 3b may be formed with microcellular foam resin separately, and after then the inner frame 3a and the outer frame 3b may be stacked and connected to each other so as to be integrated.

The opening 27a of the inner frame 3a serves as a first light extraction portion 9a from the light guide space 25a. Likewise, the opening 27b between the outer frame 3b and the inner frame 3a serves as a second light extraction portion 9b from the light guide space 25b. The light extraction portion 9b is an opening that is formed around the light extraction portion 9a and at the side of the LED lighting device 1, and surrounded by the openings of the inner frame 3a and the outer frame 3b.

The light extraction portion 9b of the light guide space 25b is formed in an outer circumference of the respective openings 27a of the inner frame 3a. Also, as described above, the respective light guide spaces 25a of the respective recess portions 33a are formed independently from each other. As a result, it makes it possible to extract light separately from the light extraction portion 9a and the light extraction portion 9b, respectively.

It should be noted that the LED lighting device 1 is used such that a light emitting direction from the light extraction portion 9a is directed to the opening face direction of the opening of the inner frame. Here, the "opening face direction of the opening of the inner frame" means the direction perpendicular to the opening of the inner frame.

It should be noted that, when the frame 3 in which the boundary portion between the inner frame 3a and the outer frame 3b is continuously linked and integrally formed with the hinge portion 37 is used, it is impossible to extract light from the hinge portion 37. Thus in this case, the light is extracted from the outer circumference direction of the light extract portion 9b other than the hinge portion 37 side.

In the substantially center of the wall portion 29a of the inner frame 3a, the LED light source 23a, which serves as the first LED light source, is disposed on the surface side of the inner frame 3a in the light guide space 25a with the light emitting face thereof being directed toward the surface of the curved face portion 31a. In other words, the LED light sources 23a are disposed at the wall portions 29a of the respective recess portions 33a of the inner frame 3a with the light emitting faces being directed in the same direction.

It should be noted that each of the LED light sources 23a is connected to a circuit board 19 which is disposed at a back face side of the wall portion 29a. Also, through holes are provided in substantially centers of the wall portions 29a of the respective recess portions 33a of the inner frame 3a. The LED light sources 23a are disposed in the respective through holes such that the LED light sources 23a are directed in the same direction with respect to the respective wall portions 29a of the inner frame 3a, respectively. Thus, a pair of the LED light sources 23a is capable of being attached to different positions in the longitudinal direction of the same circuit board 19. In this case, it is preferable to dispose the LED light source 23a at a position that is invisible from the light extraction portion 9a of the inner frame 3a.

The LED light source 23b, which serves as the second LED light source, is disposed in the rear face of the curved face portion 31a of the inner frame 3a, with the light emitting face thereof being directed toward the surface side of the outer frame 3b. The LED light source 23b is arranged by wiring a flexible flat cable 21 from the circuit board 19.

It should be note that the LED light source 23b may be disposed on the rear face of the inner frame 3a in the light guide space 25b, or on the surface of the outer frame 3b. In other words, the LED light source 23b is disposed at a position that is invisible from the light extraction portion 9b at substantially center position inside the light guide space 25b. The LED light source 23b is arranged in the substantially center in the width direction of either of the curved face portions 31a or 31b of the inner frame 3a or the outer frame 3b and on either of the surface of the outer frame 3b or the rear face of the inner frame 3a, with the light emitting face thereof being directed toward the opposing face.

The openings 27a and 27b of the inner frame 3a and the outer frame 3b are covered by the light transmissive member 11. The light transmissive member 11 has a first light transmissive portion 11a and a second light transmissive portion 11b. In other words, the light transmissive member 11 has a structure in which the light transmissive portion 11a covers the light extraction portion 9a and the light transmissive portion 11b covers at least part of the light extraction part 9b. It should be noted that the light extraction portion 9a may have the same size as, or greater than, the opening 27a, corresponding to a position corresponding to the opening 27a of the light transmissive portion 11a.

Here, the opening 27b of the outer frame 3b is disposed behind the opening 27a of the inner frame 3a. A vicinity of an edge of the opening 27a of the inner frame 3a contacts the light transmissive portion 11a to be fixed thereto, and a vicinity of an edge of the opening 27a of the outer frame 3b contacts the light transmissive portion 11b to be fixed thereto behind the light transmissive portion 11a. The vicinity of the edge of the opening 27a of the inner frame 3a may be fixed to the light transmissive portion 11a by adhering, likewise the vicinity of the edge of the opening 27b of the outer frame 3b may be fixed to the light transmissive portion 11b by adhering.

The light transmissive portion 11a is arranged to be extended to the light guide space 25b outside, and the light transmissive portion 11a is substantially perpendicular to the light transmissive portion 11b to be integrated together. In an example in FIG. 2, the light extraction portion 9b is formed with the extending portion of the light transmissive portion 11a and a portion covered by the light transmissive portion 11b. The light transmissive portions 11a and 11b may have surfaces that are molded members formed by bending a flat, smooth and transparent acrylic plate, respectively. Each of the light transmissive members 11a and 11b is a molded member or the like that has, for example, prism shape to cause the light to be diffused to transmit or a lens structure in which a number of fine protrusions of convex lens are formed. Also, each of the light transmissive member 11a and 11b is a molded member or the like in which an unevenness is formed on the surface thereof in a satin finished manner.

As described above, the light extraction portion 9a is provided at an upper side of the LED lighting device 1, and the light extraction portion 9b is provided at a side of the LED lighting device 1. As a result, the light transmissive portions 11a and 11b have a predetermined angle (right angle in the example shown in the drawings) each other. In other words, the light transmissive portion 11a and the light transmissive portion 11b are arranged in the different direction from each other.

It should be noted that the light transmissive members 11a and 11b may be separate members from each other, or formed with an integral member. When the light transmissive members 11a and 11b are separate bodies, the light transmissive portion 11a is fixed in the vicinity of the edge of the opening 27a of the inner frame 3a, and the light transmissive portion 11b is fixed in the vicinity of the edge of the outer frame 3b. Also, even when the light transmissive portions 11a and 11b are integral, the light transmissive portion 11a is fixed in the vicinity of the edge of the opening 27a of the inner frame 3a, and the light transmissive portion 11b is fixed in the vicinity of the edge of the outer frame 3b. It should be noted that, in this case, the light transmissive portion 11a and the light transmissive portion 11b may be bent to be formed. Also in this case, it is possible to keep the strength and achieve the light weighted device by making the thickness of a bent portion of the light transmissive portion 11a and the light transmissive portion 11b thinner.

The LED light source 23a disposed inside the light guide space 25a emits light with the light emitting face being directed toward the light guide space 25a. As a result, the light from the LED light source 23a is diffused and reflected on the surface side of the inner frame 3a the light floating and emitted from the light extraction portion 9a. When the light transmits the light transmissive portion 11a of the light extraction portion 9a, a part of incident light into the light guide space 25a is reflected by the light diffusing layer or the lens structure, which is provided on an inner face and an opposing outer face at the light guide space 25a side of the light transmissive portion 9a. Nevertheless, basically, providing the light diffusing layer or the lens structure allows the light transmissive portion 11a to be designed to have a higher efficiency of the light extraction, as compared to the case in which the surface of the light transmissive portion 11a is flat and smooth and not provided with such structure.

Light is multiply-reflected between the inner face and the outer face of the light transmissive portion 11a, and a part of light is reflected inside the light guide space 25a and a remaining part of the light is irradiated outside. In this way, it makes it possible to make in-plane distribution of the irradiation light be further uniformed and to expand the irradiation range of the illumination light by the light diffusion effect of the light transmissive portion 11a.

The LED light source 23b disposed inside the light guide space 25b emits light toward the light guide space 25b. Thus, light from the LED light source 23b is diffused and reflected on the rear face side of the inner frame 3a and the surface side of the outer frame 3b, and is emitted from the light extraction portion 9b. Similarly to the light extraction portion 9a, also when light transmits the light transmissive portion 11b of the light extraction portion 9a, it makes it possible to make the in-place distribution of the irradiation light be further uniformed and expand the irradiation range of the illumination light by the light diffusion effect of the light transmissive portion 11b.

By arranging the light extraction portions 9a and 9b to be perpendicular to each other, it makes it possible to allow the light to be emitted in the perpendicular direction to each other from the light extraction portions 9a and 9b. In other words, it makes it possible to extract, from the light extraction portion 9a, light in the opening face direction of the opening 27a of the inner frame 3a, and to extract, from the light extraction portion 9b, light in the side face direction of the lighting device orthogonal to the opening face direction of the opening 27a of the inner frame 3a. That is, by designing the arrangement or the direction of the light extraction portions 9a and 9b, it makes it possible to set the irradiation direction of the respective illumination light beams or an angle between the two irradiation directions so as to freely design the irradiation range or the dramatic effect.

Furthermore, it makes it possible to irradiate two irradiation positions with light, although in the same direction, from respective light extraction portions 9a of the inner frame 3a. Alternatively, it makes it possible to irradiate two irradiation positions with light with the irradiation directions being changed within the prescribed range.

It should be noted that the light color may be different between the LED light sources 23a and the LED light source 23b. For example, the light of the LED light source 23a may be white or light yellow colored illumination light, and the light of the LED light source 23b may be decorative colored LED light source of any one of red color, yellow color, green color, and blue color. Alternatively, the LED light source 23b may be an illumination capable of changing red, green or blue colors to be used.

With the LED light sources so configured, it makes it possible to use the LED light sources such that, for example, the LED light source 23a is for practical light and the LED light source 23b is for light having different color from the LED light source 23a for a decorative use so as to enhance the dramatic effect. Also, by changing the color of the illumination light for the decorative use depending on daytime or nighttime or four seasons, it makes it possible to create atmosphere in compliance with the time and seasons so as to further enhance the dramatic effect.

It should be noted that, in this case, it is preferable that the ratio of the illuminance of the light from the inner frame 3a (respective light extraction portions 9a) to the illuminance of the light from the outer frame 3b (light extraction portion 9b) is 1.5 to 3.0. It makes it possible to assure the illuminance as the illumination light with respect to the light for the decorative use.

The light color of the respective LED light sources 23a disposed in a pair of the recess portions 33a of the inner frame 3a may differ from each other. Furthermore, the light colors of the pair of the LED light sources 23a and LED light source 23b may all or totally differ from one another.

Due to the Purkinje phenomenon, in the photoreceptor cells, a cell having a higher sensitivity with respect to the blue light operates dominantly than a cell recognizing the red color. For this reason, when an illumination for the decorative use having the dual structure is used in a dark environment such as an automotive interior or the like in this way, it is preferable to use the blue color light that is recognizable to be bright by the photoreceptor cells.

It should be noted that the light transmissive portions 11a and 11b may change the color of light instead of the LED light sources 23a and the LED light source 23b changing the color of light. For example, by coloring the light transmissive portions 11a and 11b, it makes it possible to change the color of light emitted from the light extracting portions 9a and 9b.

Here, the material of the light transmissive member 11 is, for example, a transparent or translucent acrylic resin, a PET or polycarbonate (PC) resin, glass, a polyester resin sheet. Also, the light transmissive member 11 may be a transparent resin material or a glass material to which a colored film is stuck. For example, the colored film may be a transparent polyester film.

As the material of the light transmissive member 11, a translucent acrylic plate of milky white color may be used. Also, the light transmissive member 11 may be provided with a light diffusion layer to which the light reflective function is applied by sticking a prism sheet or the like having a fine uneven shape on a surface of a transparent resin. As the light transmissive member 11, it is possible to use a molded material having a prism shape, which allows the light to be diffused to transmit, or a lens structure in which a number of protrusions of a concave shape are provided on the surface thereof.

Here, the above-mentioned lens structure may be formed on a rear face of the light transmissive member 11 instead of the surface thereof. In other words, the light diffusion layer or the lens structure may be provided on either face of the faces at the light guide spaces 25a and 25b of the light transmissive portions 11a and 11b or the light extracting face at the opposite side. It should be noted that the above-mentioned lens structure is preferably formed on the rear face of the light transmissive member 11 to have a higher cleaning capability and to reduce the risk of breakage or the like of the light transmissive member 11.

The size of a number of the protrusions of prism or concave shape formed on the light transmissive member 11 is, for example, 2 mm to 4 mm. Assuming that the outer size of the light transmissive member is, for example, 90 mm×60 mm, and the size of one protrusion of the prism shape is, for example, 3.0 mm×3.0 mm, then it is possible to provide a lens structure having 600 protrusions (=30×20). Also, a molded material in which the unevenness of the satin finished shape is formed on the surface thereof may be used.

It should be noted that a flanged reflector plate 35a is formed toward the outside at the edge of the opening 27a of the inner frame 3a (as shown in FIGS. 2 and 3). The flanged reflector plate 35a is arranged to extend to cover the light transmissive portion 11a to reach the end of the light transmissive portion 11a. For this reason, it makes it possible to prevent light in the light guide space 25b (between the outer frame 3b and the inner frame 3a) from being emitted in the same direction as the light extraction portion 9a. In other words, the flanged reflector plate 35a closes a part of the opening 27b, and the light extraction portion 9b is formed only at the side of the LED lighting device 1.

It should be noted that the vicinity of the edge of the opening 27a of the inner frame 3a (the flanged reflector plate 35a) contacts the light transmissive portion 11a, and the vicinity of the edge of the opening 27b of the outer frame 3b contacts the light transmissive portion 11b. Also, the vicinity of the edge of the opening 27b of the outer frame 3b may be adhered to the light transmissive portion 11b. The vicinity of the edge of the opening 27a of the inner frame 3a (the flanged reflector plate 35a) may be adhered to the light transmissive portion 11a. It should be noted that the flanged reflector plate 35a may be integrated with the inner frame 3a, or may be attached to the light transmissive portion 11a as a separate members, respectively.

Here, according to the present invention, a state that the vicinities of the edges of the respective openings 27a and 27b of the inner frame 3a and the outer frame 3b contact the light transmissive portions 11a and 11b, respectively, not only means to directly contact each other but also includes to contact through other member. In other words, it means that a gap that causes light to leak is not formed between the vicinities of the edges of the respective openings 27a and 27b of the inner frame 3a and the outer frame 3b and the light transmissive portions 11a and 11b.

A light transmission preventive member 15 is arranged immediately above the LED light source 23a, as appropriate. In other words, the light transmission preventive member 15 is provided so as to close a part of the light extraction portion 9a. The light transmission preventive member 15 shields light from the LED light source 23a. For this reason, it makes it possible to prevent the direct light from the LED light source 23a from being extracted from the light extraction portion 9a by the light transmission preventive member 15.

It should be noted that the light transmission preventive member 15 may be made of the microcellular foam resin, similarly to the inner frame 3a and the outer frame 3b. By doing this, it makes it possible to diffuse and reflect light from the LED light source 23a even on the rear face side of the light transmission preventive member 15. It should be noted that the direct light from the LED light source 23b can be shielded by the inner frame 3a because the LED light source 23b is disposed on the back face side of the inner frame 3a.

A selector switch 5 is disposed in the vicinity of the edge of the light transmissive portion 11a. In an example shown in the drawings, the selector switch 5 is disposed at upper portion of the light transmissive portion 11a. A terminal of the selector switch 5 is connected to the LED light sources 23a and 23b and a power source device (not shown) by wiring. The selector switch 5 is connected to a circuit board 19.

The selector switch 5 is capable of causing the illumination of the outer frame 3b to be lit and unlit and switching the lighting up and lighting down of the respective LED light sources 23a of the inner frame 3a. It should be noted that a contact type capacitance switch may be provided above the light transmissive portion 11a as the selector switch 5. For example, switching the illumination in the respective recess portions 33a of the inner frame 3a can be performed by the contact type capacitance switch.

The circuit board 19 is a controller board controlling the LED light sources 23a and 23b, and a rigid board of, for example, a glass epoxy substrate. The LED light source 23a is directly mounted by soldering to a circuit on the circuit board 19. Further, a flexible flat cable 21 is connected to the circuit board 19 to connect to the LED light source 23b which is positioned apart from the circuit board 19.

More particularly, the circuit board 19 is disposed at the outside of the wall portion 29a of the inner frame 3a. The selector switch 5 is joined to the circuit board 19 via the circuit on the board. It should be noted that the circuit board 19 and the selector switch 5 may be directly connected, or the circuit board 19 and the terminal of the selector switch 5 may be connected by wiring. An operational portion of the selector switch 5 is exposed over the light transmissive portion 11a.

In addition, the circuit board 19 is connected to a terminal 7, and the terminal 7 penetrates the wall portion 29b of the outer frame 3b to be exposed outside the outer frame 3b. The LED light source 23a is mounted on the circuit board 19, and the light emitting face of the LED light source 23a is exposed to the light guide space 25a through a hole formed in the wall portion 29a of the inner frame 3a.

The wiring of the flexible flat cable 21 is connected to the circuit board 19. The flexible flat cable 21 is disposed from the wall portion 29a of the inner frame 3a along the curved face portion 31a of the inner frame 3a. The LED light source 23b is connected to the flexible flat cable 21. In other words, the wiring connecting the selector switch 5 to the LED light source 23a is constituted with the rigid circuit board 19, and the wiring connecting the circuit board 19 to the LED light source 23b is constituted with the flexible flat cable 21.

It should be noted that the flexible flat cable 21 is a multi-layered cable in which a circuit conductor (for example, a circuit formed by a copper foil or a copper wiring) is coated or adhered by a resin (for example, polyethylene terephthalate (PET) or polyimide film) from upper and lower faces. At least a pair of circuit conductors is formed inside the flexible flat cable 21 which is cut to a predetermined length. In other words, the circuit conductor serves as a wiring to connect the LED light source to the selector switch 5 or a current restricting element or the like.

In order to prevent light inside the light guide space 25b from being irradiated toward the selector switch 5 or the like, another reflector plate may be arranged between a space in which the selector switch 5 or the like is arranged and the light guide space 25b. A reflective film (reflector plate) may be stuck to a surface of the flexible flat cable 21 exposing to the light guide space 25b (an exposing face to the light guide space 25b). In this case, for example, the microcellular foam resin sheet, a diffuse reflection film, or a metal film or the like may be stuck to the surface of the flexible flat cable 21. Also, the microcellular foam resin may be used as an insulating body of the flexible flat cable 21. In this way, it makes it possible to achieve the wirings along the curved face portion 31a of the inner frame 3a or to mount the LED light source 23b by using the flexible flag cable 21 as the wirings.

Next, a function of the LED lighting device 1 according to the present invention will be described below. As described above, the lighting of the LED light sources 23a and 23b can be switched by switching the selector switch 5.

When the LED light source 23a is lit, light from the LED light source 23a is emitted from the light extraction portion 9a with the light repeating the diffuse reflection on the surface side of the inner frame 3a. In other words, light from the LED light source 23a is diffused and reflected in the light guide space 25a and incident to the light extraction portion 9a, and a part of the light is reflected on the surface or an inner face of the light transmissive portion 11a and other part of the light is emitted from the light extraction portion 9a. At this moment, as described above, the light transmission preventive member 15 can prevent the direct light from the LED light source 23a from being emitted from the light extraction portion 9a. For this reason, it makes it possible to extract light that has little glare and is uniformed. Here, the light transmission preventive member 15 may not be provided when the light transmissive portion 11a has the light diffusion function or the glare hardly occurs depending on the viewing angle in the installation use of the lighting device or the like, or when a certain level of glare is permissible.

It should be noted that, although not particularly shown in the drawings, it makes it possible to attenuate the direct irradiation light from the LED light source 23a by setting the thickness of the light transmissive member 11 disposed at the light extraction portion 9a immediately above the LED light source 23a than the thickness of the other portions of the light transmissive member 11. In this way, by absorbing light with the thicker portion of the light transmissive member 11, it makes it possible to reduce the glare even immediately above the LED light source 23a.

It makes it possible to solely light up either one of the LED light sources 23a by the selector switch 5. Also, it makes it possible to simultaneously light down or light up both of a pair of the LED light sources 23a by the selector switch 5.

On the other hand, when the LED light source 23b is lit by switching the selector switch 5, light from the LED light source 23b repeats the diffuse reflection on the rear face side of the inner frame 3a and the surface side of the outer frame 3b. Among incident light beams to the light extraction portion 9b, a part of the incident light is reflected on the surface or the inner face of the light transmissive portion 11b, and the other part of the incident light transmits the light transmissive portion 9b and is emitted from the light extraction portion 9b. The LED light source 23b is attached at a position that is invisible from the opening of the light guide space 25b, and further light from the LED light source 23b is diffused and reflected many times in the light guide space 25b and is emitted from the light extraction portion 9b. At this moment, as the light guide space 25b is positioned at the back face side of the inner frame 3a, the direct light from the LED light source 23b is unlikely to be emitted from the light extraction portion 9b. For this reason, it makes it possible to extract light from the light extraction portion 9b that has little glare and is uniformed.

For example, in the LED lighting device 1 in which the light extraction portion 9b is formed so as to surround a circumference of the light extraction portion 9a, similarly to the conventional device, when the light guide spaces are simply partitioned and arranged side by side, and the respective LED light sources are arranged in the respective light guide spaces, it is impossible to extract light having higher uniformity, because a region close to the LED light source becomes brighter and then getting darker as being distant from the light source. Also, when the LED light source 23b is formed in the light guide space such that the LED light source 23b is apart from the light extraction portion 9b at the distance equal to or greater than a certain degree to repeat the diffuse reflection, then the lighting device inevitably becomes large sized.

On the other hand, according this embodiment, the light guide spaces 25a and 25b have layered structure and the LED light source 23b is disposed in the light guide space 25b on the rear face side of the light guide space 25a, and therefore it is possible to make the distance to the light extraction portion 9b (diffuse reflection interval) be longer. Also, by allowing the light guide space 25b to be a curved light guide space, it makes it possible to adjust an angle of the diffuse reflection in the light guide space 25b and to adjust an amount of illumination light toward the light extraction portion 9b so as to extract uniformed light. As a result, it makes it possible to extract light having a higher uniformity even with, for example, one LED light source. Also, in this case, as the light guide spaces 25a and 25b are arranged in parallel to be stacked, it makes it possible to achieve the downsizing the device as compared to the case in which the light guide spaces are arranged side by side (case in which the light guide spaces are formed in the same plane).

As described above, according to this embodiment, as the inner frame 3a and the outer frame 3b function as reflector plate made of the microcellular foam resin, respectively, it is not required to provide the reflector plate as a separate body from the frame 3. For this reason, it makes it possible to reduce the number of the components.

By using the reflector plate made of the microcellular foam resin, the reflector plate becomes light weighted and has higher strength, and therefore it is possible to apply to a complicated shape and diffuse and reflect light efficiently. Also, it makes it possible to form the light guide space 25b having a curved shape from the LED light source 23b to the light extraction portion 9b. For this reason, it makes it possible to achieve the surface emission at the light extraction portion 9b in a uniformed manner.

Here, by using the microcellular foam resin for the light reflector plate, it makes it possible to make the light reflectivity be higher. Thus, even if the number of the light reflections varies to some extent, the illuminance of light extracted from the opening hardly varies, irrespective of the positions. Also, by adjusting the distance from the LED light sources 23a and 23b to the respective light extraction portions 9a and 9b or the distance among components between the inner frame 3a and the outer frame 3b, it makes it possible to design the number of the diffuse reflection from the LED light sources 23a and 23b to the respective light extraction portion 9a and 9b to be approximately equal so as to make the surface emission at the respective light extraction portions 9a and 9b be further uniformed.

As the inner frame 3a and the outer frame 3b are spaced apart from each other and stacked, it makes it possible to form the light guide spaces 25a and 25b, which are independent from each other, on the surface side and the rear face side of the inner frame 3a. In other words, it makes it possible to allow the inner frame 3a to function as the reflector plates on both of the surface and the rear face thereof. In addition, it makes it possible to allow the inner frame 3a itself to function as a partition plate for partitioning the light guide spaces 25a and 25b.

In the respective light guide spaces 25a, it makes it possible to diffuse and reflect light on the surface side of the inner frame 3a. Also, when light transmits the light transmissive portion 11a, a part of the illumination light, which is incident to the light transmissive portion 11a and transmits therethrough, is diffused and reflected so as to make light from the light extraction portion 9a be uniformed. In the light guide space 25b, light is diffused and reflected on the rear face side of the inner frame 3a and the surface side of the outer frame 3b so as to make light from the light extraction portion 9b be uniformed.

When light transmits the light transmissive portion 11b, a part of illumination light, which is incident to the light transmissive portion 11b and transmits therethrough, is diffused and reflected so as to make light be further uniformed. In this case, with the light guide spaces 25a and 25b being multi-layered structure, it makes it possible to downsize the LED lighting device 1.

As a result, according to the first embodiment, it makes it possible to extract, from at least the light transmissive portion 11a, light in the opening face direction of the opening 27a of the inner frame 3a, and also extract, from the light transmissive portion 11b, light in the side face direction orthogonal to the opening face direction of the opening 27a of the inner frame 3a.

The protrusion portions 17 are formed on the opposing faces on the rear face side of the inner frame 3a and the surface side of the outer frame 3b, and therefore it is possible to maintain the gap between the inner frame 3a and the outer frame 3b in an assumed manner.

The light transmission preventive member 15 is provided immediately above the LED light source 23a, and therefore it is possible to shield the direct light from the LED light source 23a and to reduce the glare.

The flexible flat cable 21 is used as the wirings, and therefore it is possible to freely bend the flexible flat cable 21 on the frame 3. For this reason, installing the wiring is facilitated.

It should be noted that the LED lighting device according to the present invention is in particular preferable for an atmospheric illumination use, an interior illumination use, an automotive illumination use, a rail vehicle use, or an aircraft illumination use. For example, when used as an automotive interior lamp (ceiling illumination of the vehicle), it makes it possible that the illumination light from the side face of the light extraction portion 9b irradiates the ceiling while the room interior is irradiated with the illumination light from the light extraction portion 9a. Also, by switching the light from respective light extraction portions 9a, it makes it possible to change the irradiation position. In this case, it makes it possible to use separately the color of the illumination to be directed to the ceiling and the color of the illumination to be directed to the room interior so as to significantly improve the dramatic effect of the interior space of the vehicle.

Second Embodiment

Figure 5:
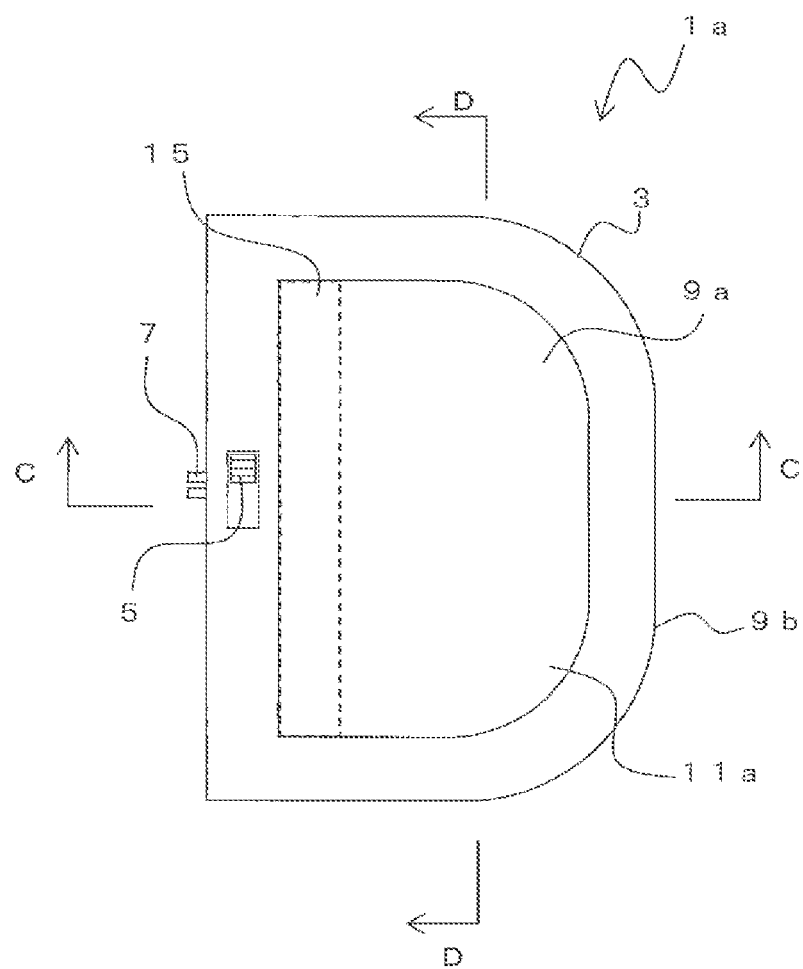
Figure 6:
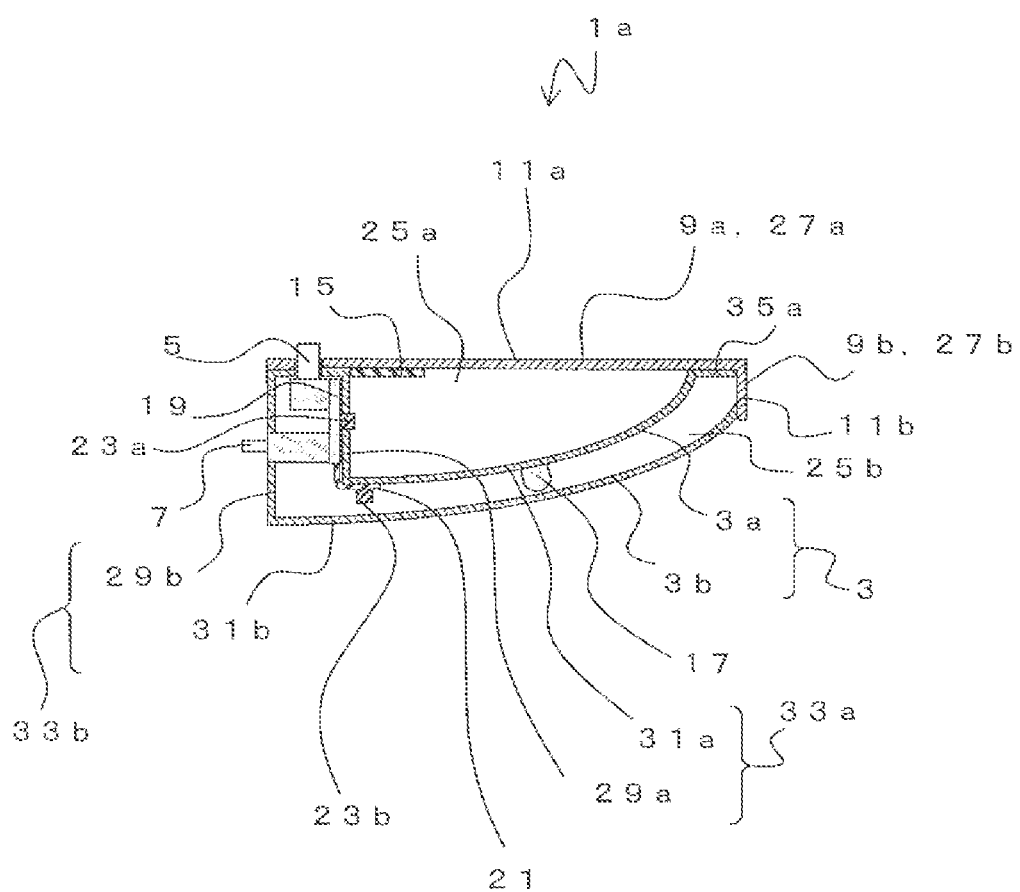
FIG. 6 is a cross-sectional view of the LED lighting device 1a taken along the line C-C in FIG. 1.
Figure 7:
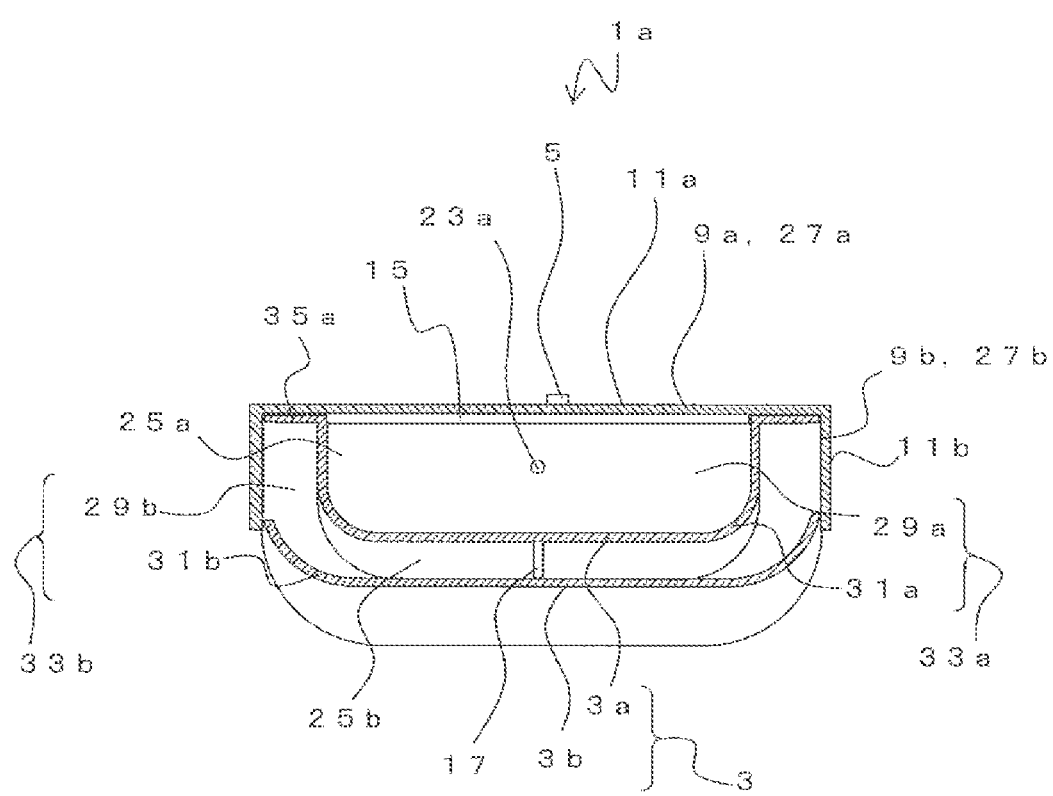
FIG. 7 is a cross-sectional view of the LED lighting device 1a taken along the line D-D in FIG. 1.

Hereinafter, a second embodiment will be described. FIG. 5 is a cross-sectional view showing an LED lighting device 1a according to the second embodiment. FIG. 6 is a cross-sectional view taken along the line C-C in FIG. 5, and FIG. 7 is a cross-sectional view taken along the line D-D in FIG. 5. It should be noted that, in the following description, components having the same function as those in the LED lighting device 1 are denoted with the same reference signs in FIGS. 1 to 4 and duplicable description will be omitted.

The LED lighting device 1a differs from the LED lighting device 1 in that the LED lighting device 1a is provided with one recess portion 33a of the inner frame 3a instead of two recess portions and one LED light source 23a is arranged at the inner frame 3a. Other configurations are similar to those in the LED lighting device 1. The opening 27a of the inner frame 3a is formed substantially on the same plane.

According to the second embodiment, the similar advantages to those in the first embodiment can be obtained. In other words, as the LED lighting device 1a has only one LED light source 23a of the inner frame 3a, unlike the LED lighting device 1, the LED lighting device 1a does not have an operational function to light down or light up one of the LED light sources 23a of the inner frame 3a to switch the lighting portions of the inner frame 3a each other. However, in terms of other functions, the second embodiment can obtain the similar advantages to those in the LED lighting device 1.

Third Embodiment

Figure 8:
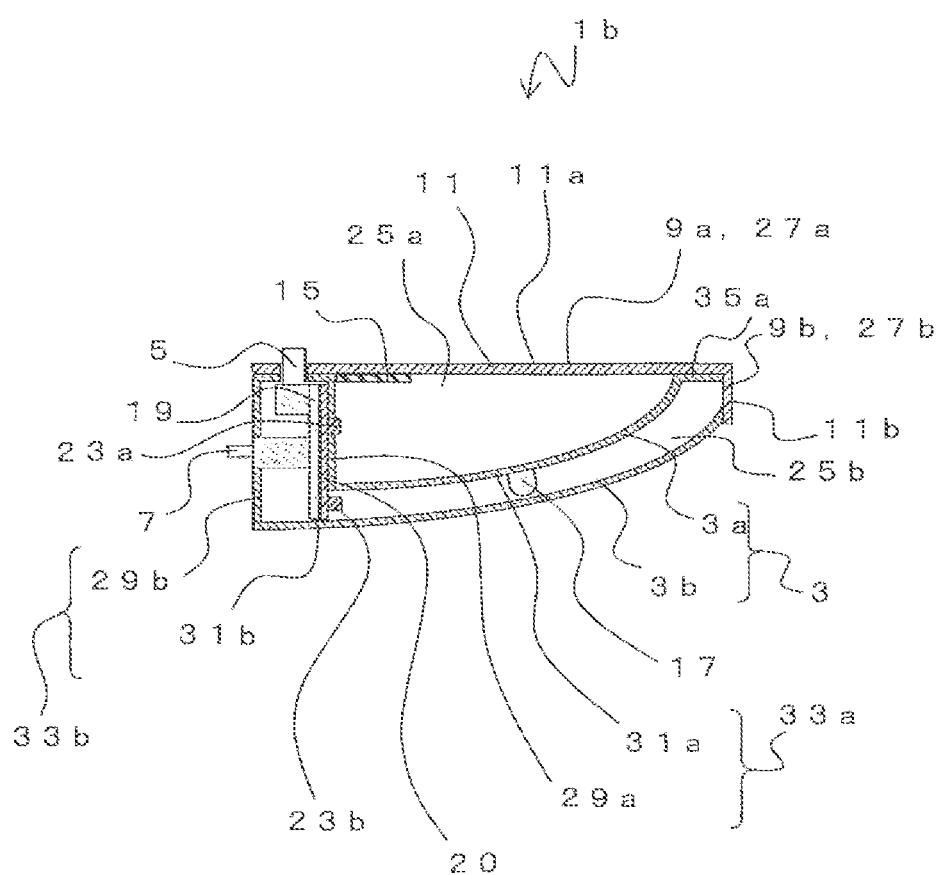
FIG. 8 is a cross-sectional view of an LED lighting device 1b.

Hereinafter, a third embodiment will be described. FIG. 8 is a cross-sectional view showing an LED lighting device 1b according to the third embodiment, and FIG. 8 corresponds to FIG. 2.

The LED lighting device 1b differs from the LED lighting device 1 in that all components are mounted onto the circuit board 19 only without the flexible flat cable 21 being used. The circuit board 19 is disposed on an outer face of the wall portion 29a of the inner frame 3a. Furthermore, the circuit board 19 protrudes in an extending direction of the wall portion 29a toward the direction of the curved face portion 31b of the outer frame 3b.

The LED light sources 23a and 23b are arranged to be spaced apart from each other on the same plane direction of the circuit board 19. A pair of LED light sources 23a is exposed to the respective light guide spaces 25a through holes formed in the respective wall portions 29a of the inner frame 3a. Also, the LED light source 23b emits light in the light guide space 25b toward the surface side of the curved face portion 31b of the outer frame 3b (or the rear face side of the curved face portion 31a of the inner frame 3a).

A reflector plate 20 is provided on a face facing the light guide space 25b of the circuit board 19. By doing this, it makes it possible to prevent light from the LED light source 23b from being absorbed by the circuit board 19. It should be noted that the reflector plate 20 is preferably made of the microcellular foam resin.

According to the third embodiment, the similar advantages to those in the first embodiment can be obtained. Also, as no other wirings are provided other than the circuit board 19, the number of components is reduced and the wiring operation is not required. In addition, the rigidity is higher as compared to the flexible flat cable 21.

As a result, according to the third embodiment, similarly to the first embodiment, it makes it possible to extract, from the light transmissive portion 11a, light in the opening face direction of the opening 27a of the inner frame 3a, and also extract, from the light transmissive portion 11b, light in the side face direction orthogonal to the opening face direction of the opening 27a of the inner frame 3a.

It should be noted that, in the third embodiment, the LED lighting device 1b may be provided with one recess portion of the inner frame 3a instead of two recess portions and one LED light source 23a is arranged at the inner frame 3a as well. In other words, all components may be mounted onto the circuit board 19 only without the flexible flat cable 21 being used with respect to the second embodiment.

By doing this, the similar advantages to those in the third embodiment can be also obtained. That is, as no other wirings are provided other than the circuit board 19, the number of components is reduced and the wiring operation is not required. In addition, the rigidity is higher as compared to the flexible flat cable 21. As a result, it makes it possible to extract, from the light transmissive portion 11a, light in the opening face direction of the opening 27a of the inner frame 3a, and also extract, from the light transmissive portion 11b, light in the side face direction orthogonal to the opening face direction of the opening 27a of the inner frame 3a. Accordingly, the third embodiment can achieve the similar light extraction effect to those in the first embodiment.

Fourth Embodiment

Figure 9:
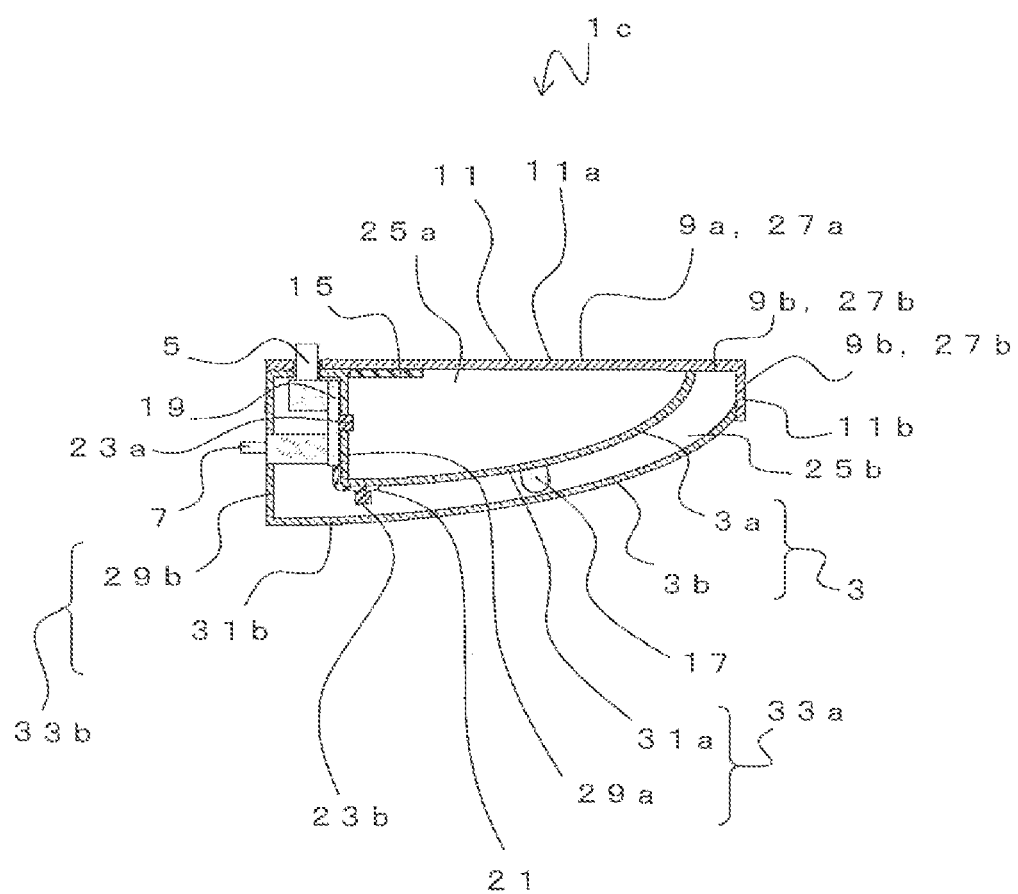
FIG. 9 is a cross-sectional view of an LED lighting device 1c.

Hereinafter, a fourth embodiment will be described. FIG. 9 is a cross-sectional view showing an LED lighting device 1c according to the fourth embodiment. Although the LED lighting device 1c has an approximately similar configuration to those in the LED lighting device 1, the LED lighting device 1c differs from the LED lighting device 1 in that the light extraction portion 9b is additionally formed in the same direction as the light extraction portion 9a.

In the afore mentioned embodiments, the light extraction portion 9b is formed only on the side of the LED lighting device 1b, and the light emitting directions of the light extraction portions 9a and 9b are perpendicular to each other. On the other hand, the light extraction portions 9b of the LED lighting device 1c are formed in two directions, that is, the same direction to the light extraction portion 9a and an orthogonal direction to the light extraction portion 9a.

For this reason, according to the fourth embodiment, it makes it possible to extract light, from the light extraction portion 9a, in the opening face direction of the opening 27a of the inner frame, and also extract light, from the light extraction portions 9b, in two directions, that is, the opening face direction of the opening 27a of the inner frame 3a and the side face direction of the LED lighting device orthogonal to the opening face direction of the opening 27a of the inner frame 3a. Here, it is needless to say that the light extraction portions 9b are also capable of extracting light in an oblique direction between the opening face direction of the opening 27a of the inner frame 3a and the side face direction of the LED lighting device orthogonal to the opening face direction of the opening 27a of the inner frame 3a.

In this case, the light extraction portion 9a is covered by the light transmissive portion 11a and the light transmissive portion 11a is arranged to extend to the light guide space 25b. As a result, the light extraction portions 9b are covered by the light transmissive portion 11a and the light transmissive portion 11b. In this case, the light transmissive portion 11a and the light transmissive portion 11b intersect with each other at a predetermined angle and arranged toward the different directions from each other.

In this case, the vicinity of the edge of the opening 27a of the inner frame 3a contacts the light transmissive portion 11a to be fixed thereto. In addition, the light transmissive portion 11b is formed at a predetermined angle from the end portion of the light transmissive portion 11a, and the vicinity of the edge of the opening 27b of the outer frame 3b contacts the end portion of the light transmissive portion 11b to be fixed thereto.

It should be noted, also in this case, a flanged reflector plate 35a made of the microcellular foam resin may be formed along the extending portion of the light transmissive portion 11a at a part of the vicinity of the edge of the opening 27a of the inner frame 3a. In this case, when the flanged reflector plate 35a is arranged to the end portion of the light transmissive portion 11a, the fourth embodiment becomes similar to the LED lighting device 1 shown in FIG. 1. However, according to this embodiment, it is sufficient to form the flanged reflector plate 35a before the light transmissive portion 11b. Here, when the flanged reflector plate 35a is formed, it is preferable to stick the flanged reflector plate 35a onto the inner face of the light transmissive portion 11a to be fixed thereto, or bring it into contact tightly with the inner face thereof.

According to the fourth embodiment, the similar advantages to those in the first embodiment can be obtained. Also, the outer frame 3b is provided to be spread behind the opening 27a of the inner frame 3a in the vicinity of the inner frame 3a. For this reason, according to the LED lighting device 1c of this embodiment, it makes it possible to extract light from the LED light source 23a through the opening 27a of the light guide space 25a in the opening face direction of the inner frame 3a, and also extract light from the LED light source 23b through the opening of the light guide space 25b in the direction from the opening face direction of the inner frame 3a to an outer circumference direction of the inner frame 3a.

As described above, according to the present embodiment, the light extraction portions 9b may be formed in a plurality of directions, that is, toward the extending portion of the light transmissive portion 11a and the light transmissive portion 11b, and light from the light guide space 25b may be emitted in the both direction, that is, a front face side of the LED lighting device 1c (upper portion in the drawings) and a side thereof. In other words, the light extraction portions 9b may be covered by the extending portion of the light transmissive portion 11a and the light transmissive portion 11b.

It should be noted that, also in the fourth embodiment, the LED lighting device 1c is provided with one recess portion of the inner frame 3a instead of two recess portions and one LED light source 23a is arranged at the inner frame 3a. In other words, the light extraction portion 9b is additionally formed in the same direction as the light extraction portion 9a with respect to the second embodiment.

Even in the case in which one recess portion is formed, similar advantages to those in the fourth embodiment can be obtained. In other words, it makes it possible to extract light from the LED light source 23a through the opening 27a of the light guide space 25a in the opening face direction of the inner frame 3a, and also extract light from the LED light source 23b through the opening of the light guide space 25b in the direction from the opening face direction of the inner frame 3a to an outer circumference direction of the inner frame 3a.

Fifth Embodiment

Figure 10:
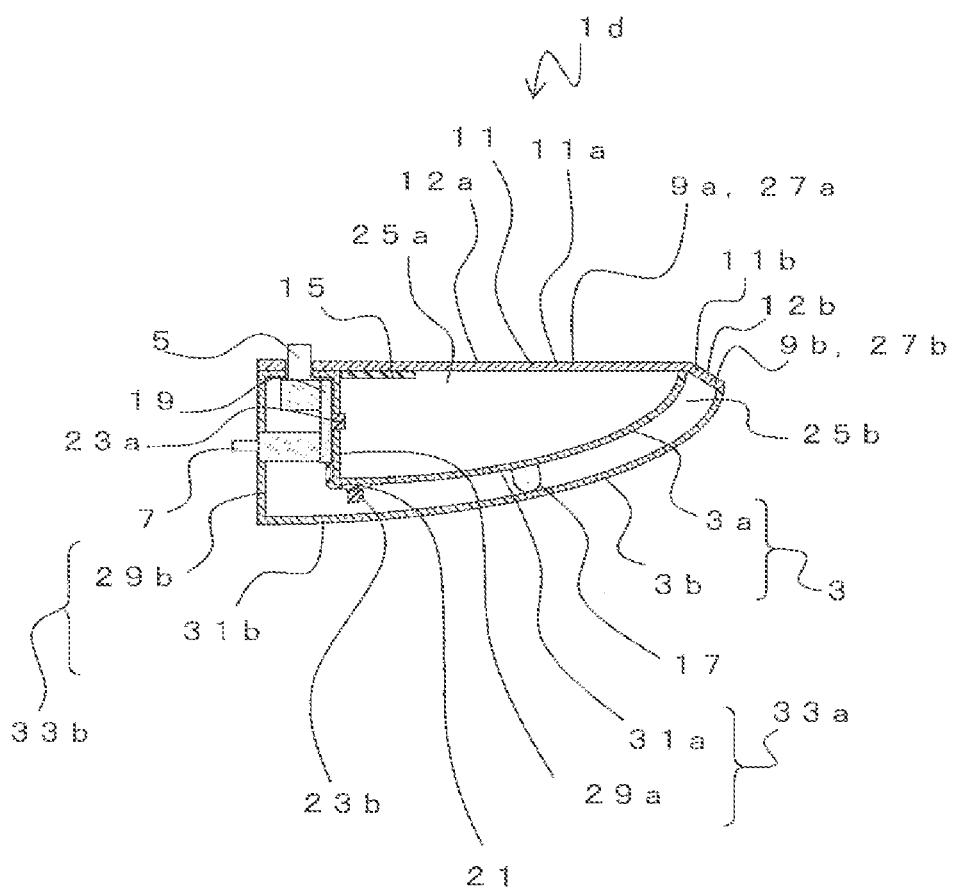
FIG. 10 is a cross-sectional view of an LED lighting device 1d.

Hereinafter, a fifth embodiment will be described. FIG. 10 is a cross-sectional view showing an LED lighting device 1d according to the fifth embodiment. Although the LED lighting device 1d has an approximately similar configuration to those in the LED lighting device 1, the LED lighting device 1d differs from the LED lighting device 1 in that the light transmissive portion 11a is not provided with the extending portion.

In the light transmissive member 11 in which the light transmissive portion 11a and the light transmissive portion 11b are integral, the light transmissive portion 11a and the light transmissive portion 11b intersect with each other at a predetermined angle and have faces in the different direction from each other, respectively. A boundary between the light transmissive portion 11a and the light transmissive portion 11b is a location that the end portion of the inner frame 3a contacts. In FIG. 10, the inner frame 3a contacts an corner portion of the light transmissive member 11, in which an angle between the light transmissive portion 11a and the light transmissive portion 11b is an obtuse angle, and the corner portion of the light transmissive member 11 forms the boundary between the light transmissive portion 11a and the light transmissive portion 11b.

The light transmissive portion 11a constitutes a planer face portion 12a and the light transmissive portion 11b constitutes an oblique face portion 12b. In other words, a shape formed by combining the light transmissive portion 11a with the light transmissive portion 11b is a saucer shape composed of the planer face portion 12a and the oblique face portion 12b.

In this case, the vicinity of the edge of the opening 27a of the inner frame 3a abuts on the vicinity of the edge of the light transmissive portion 11a to be fixed thereto. An end portion of the outer frame 3b abuts on a lower portion of the light transmissive portion 11b, which is bent, to be fixed thereto. Also, the light extraction portion 9a is covered by the light transmissive portion 11a and the light extraction portion 9b is solely covered by the light transmissive portion 11b.

It should be noted that a size of the inner frame 3a and the outer frame 3b can be adjusted as appropriate. For example, when the opening 27b of the outer frame 3b is formed larger than the opening 27a of the inner frame 3a, an angle between the light transmissive portion 11a and the light transmissive portion 11b becomes an obtuse angle. On the other hand, when the opening 27b of the outer frame 3b is formed smaller than the opening 27a of the inner frame 3a, an angle between the light transmissive portion 11a and the light transmissive portion 11b becomes an acute angle. In this way, even when the angle between the light transmissive portion 11a and the light transmissive portion 11b is an acute, right or obtuse angle, it makes it possible to extract light mainly in the outer circumferential direction of the inner frame 3a from the light extraction portion 9b, as long as, for example, the formed angle is formed within the predetermined range from 60 degrees to 120 degrees.

Also, at the end portion of the inner frame 3a, the light transmissive portion 11a and the light transmissive portion 11b may be orthogonal to each other. Even in this case, the end portion of the inner frame 3a abuts a portion at which the light transmissive portion 11a and the light transmissive portion 11b are orthogonal to each other to be fixed thereto. The end portion of the outer frame 3b abuts on a lower portion of the light transmissive portion 11b, which is bent, to be fixed thereto. It should be noted that, in this case, in a plan view, the opening 27b of the outer frame 3b of the LED lighting device 1d is formed to have the same size as the opening 27a of the inner frame 3a. Also, the light extraction portion 9a is covered by the light transmissive portion 11a and the light extraction portion 9b is covered solely by the light transmissive portion 11b which is orthogonal to the light extraction portion 9a.

As a result, according to the fifth embodiment, similarly to the first embodiment, it makes it possible to extract, from the light transmissive portion 11a, light in the opening face direction of the opening 27a of the inner frame 3a, and also extract, from the light transmissive portion 11b, light in the side face direction intersecting with the opening face direction of the opening 27a of the inner frame 3a at a predetermined angle.

In particular, when the light transmissive portion 11a and the light transmissive portion 11b are orthogonal to each other, it makes it possible to extract, from the light transmissive portion 11b, light in the opening face direction of the opening 27a of the inner frame 3a and in the side face direction orthogonal thereto.

According to the fifth embodiment, it makes it possible to downsize the lighting device by a size of the flanged reflector plate 35a with respect to the first embodiment.

Also, it makes it possible to extract light from the light extraction portions 9a and 9b in the different directions from each other depending on the angles formed respectively. In other words, according to a method of extracting light using the LED lighting device according to the fifth embodiment, it makes is possible to extract, from the light transmissive portion 11a, light in the opening face direction of the opening 27a of the inner frame 3a, and extract, from the light transmissive portion 11b, light in the side face direction intersecting with the opening face direction of the opening 27a of the inner frame 3a at a predetermined angle. In particular, when the light transmissive portion 11a and the light transmissive portion 11b are orthogonal to each other, it makes it possible to extract, from the light transmissive portion 11b, light in the direction from the opening face direction of the opening 27a of the inner frame 3a to the side face direction orthogonal thereto.

In this way, it makes it possible to extract, from the light extraction portion 9a, light in the opening face direction of the opening 27a of the inner frame 3a, and extract, from the light extraction portion 9b, light in the direction at least including either in the opening face direction of the opening 27a of the inner frame 3a or the side face direction orthogonal to the opening face direction of the opening 27a of the inner frame 3a.

It should be noted that, also in the fifth embodiment, the LED lighting device 1d is provided with one recess portion of the inner frame 3a instead of two recess portions and one LED light source 23a is arranged at the inner frame 3a. In other words, the light transmissive portion 11a is not provided with the extending portion with respect to the second embodiment in which one recess portion is formed.

As described above, even in the case in which one recess portion is formed, similar advantages to those in the fifth embodiment can be obtained. In other words, it makes it possible to downsize the lighting device by a size of the flanged reflector plate 35a with respect to the LED lighting device 1a. Also, it makes is possible to extract, from the light transmissive portion 11a, light in the opening face direction of the opening 27a of the inner frame 3a, and extract, from the light transmissive portion 11b, light in the side face direction intersecting with the opening face direction of the opening 27a of the inner frame 3a at a predetermined angle.

Sixth Embodiment

Figure 11:
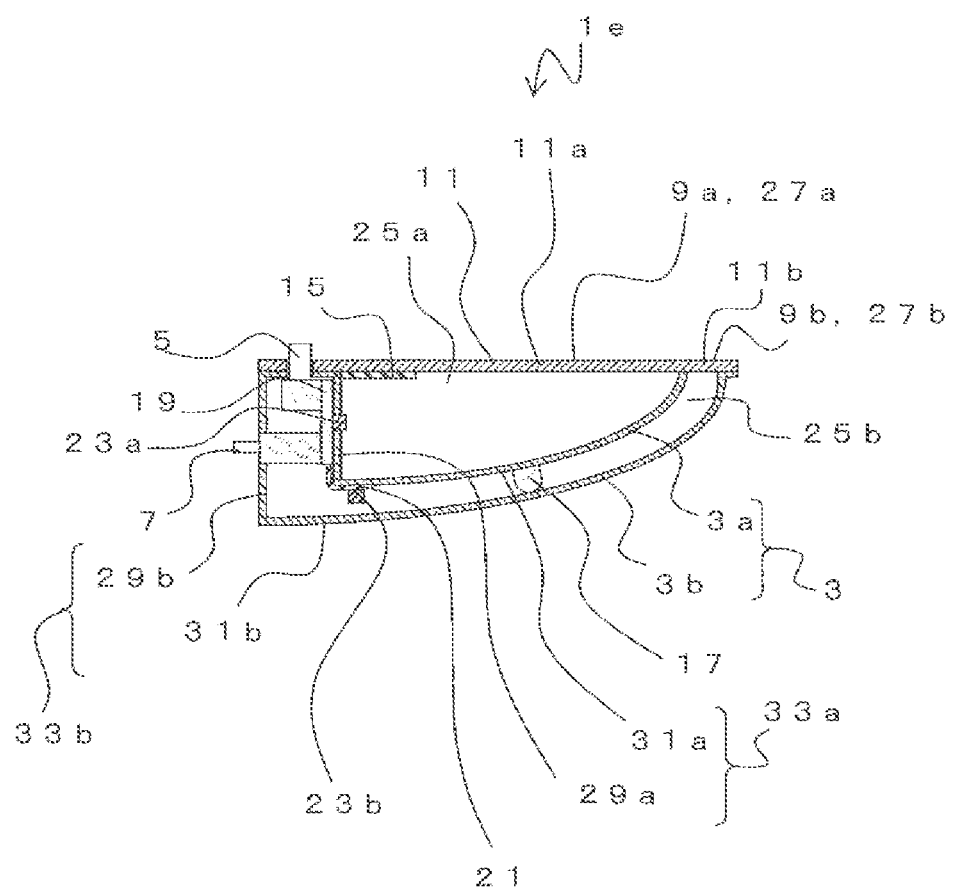
FIG. 11 is a cross-sectional view of an LED lighting device 1e.

Hereinafter, a sixth embodiment will be described. FIG. 11 is a cross-sectional view showing an LED lighting device 1e according to the sixth embodiment. Although the LED lighting device 1e has an approximately similar configuration to those in the LED lighting device 1, the LED lighting device 1e differs from the LED lighting device 1 in that the light extraction portions 9a and 9b are formed toward the same direction.

The light transmissive portion 11a and the light transmissive portion 11b of the integrally formed light transmissive member 11 are arranged substantially in a straight line and have a plane in the same direction. A boundary between the light transmissive portion 11a and the light transmissive portion 11b is a location that the end portion of the inner frame 3a contacts.

In other words, in the LED lighting device 1e, the opening 27a of the inner frame 3a if formed on the same plane as the opening 27b of the outer frame 3b, and the light extraction portion 9a and the light extraction portion 9b are formed on the same plane each other.

Also, the vicinity of the edge of the opening 27a of the inner frame 3a contacts the end portion of the light transmissive portion 11a to be fixed thereto. The vicinity of the edge of the opening 27b of the outer frame 3b contacts the end portion of the light transmissive portion 11b to be fixed thereto. It should be noted that the end portions of the inner frame 3a and the outer frame 3b may be bent along the light transmissive portions 11a and 11b, respectively. Also, the vicinity of the edge of the opening 27a of the inner frame 3 may be fixed to the light transmissive portion 11a by forming a groove in the end portion of the light transmissive portion 11a and fitting it into the groove. Likewise, the vicinity of the edge of the opening 27b of the outer frame 3b may be fixed to the light transmissive portion 11b by forming a groove in the end portion of the light transmissive portion 11b and fitting it into the groove. In this way, the light extraction portion 9a is covered by the light transmissive portion 11a, and the light extraction portion 9b is covered solely by the light transmissive portion 11b which is formed on the same plane as the light extraction portion 9a.

According to the sixth embodiment, as the light extraction portion 9b is formed so as to surround a pair of the light extraction portions 9a, it makes it possible that a pair of the light extraction portion 9a and the light extraction portion 9b irradiate different portions toward the same direction independently from each other.

Also, according to the sixth embodiment, differently from the first embodiment, both of the light transmissive portions 11a and 11b are capable of extracting light in the opening face direction of the opening 27a of the inner frame 3a.

It should be noted that, also in the sixth embodiment, the LED lighting device 1e is provided with one recess portion of the inner frame 3a instead of two recess portions and one LED light source 23a is arranged at the inner frame 3a. In other words, the light extraction portions 9a and 9b are formed toward the same direction each other with respect to the second embodiment in which one recess portion is formed.

Even in the case in which one recess portion is formed, similar advantages to those in the sixth embodiment can be obtained. In other words, the opening 27a of the inner frame 3a is formed on the same plane as the opening 27b of the outer frame 3b, and the light extraction portion 9a and the light extraction portion 9b are formed on the same plane each other. Both of the light transmissive portions 11a and 11b are capable of extracting light in the opening face direction of the opening 27a of the inner frame 3a.

Seventh Embodiment

Figure 12:
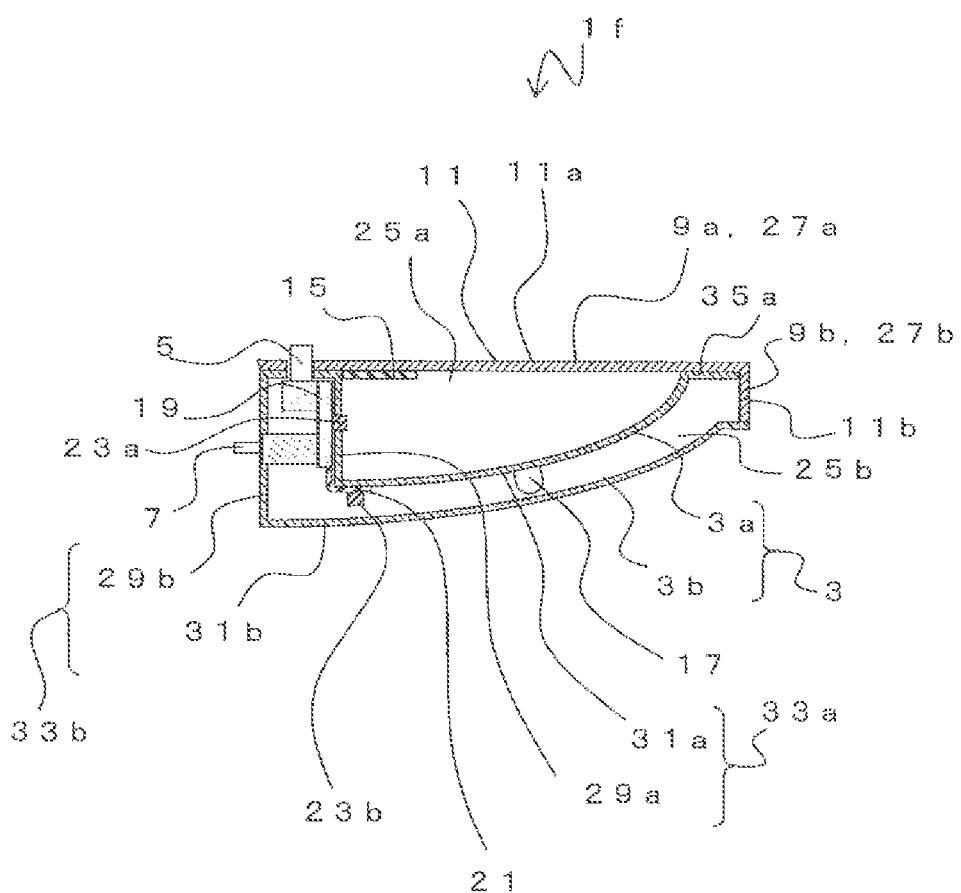
FIG. 12 is a cross-sectional view of an LED lighting device 1f.

Hereinafter, a seventh embodiment will be described. FIG. 12 is a cross-sectional view showing an LED lighting device 1f according to the seventh embodiment. Although the LED lighting device 1f has an approximately similar configuration to those in the LED lighting device 1, the LED lighting device 1f differs from the LED lighting device 1 in that the end portion of the outer frame 3b is bent in a flange shape.

The light transmissive portion 11a and the light transmissive portions 11b of the integrally formed light transmissive member 11 intersect with each other at a predetermined angle and have planes in the different directions from each other. A boundary between the light transmissive portion 11a and the light transmissive portion 11b is a location that the end portion of the flanged reflector plate 35a of the inner frame 3a contacts. In FIG. 9, the light transmissive portion 11a and the light transmissive portion 11b are orthogonal to each other, and the end portion of the flanged reflector plate 35a contacts the corner portion of the light transmissive member 11 so as to form the boundary between the light transmissive portion 11a and the light transmissive portion 11b.

A front edge of the inner frame 3a is bent in a flange shape along the light transmissive portion 11a in an outer circumferential direction of the inner frame 3a (flanged reflector plate 35a). Also, a front edge of the outer frame 3b is bent in a flange shape in approximately parallel to the flanged reflector plate 35a of the inner frame 3a in an outer circumferential direction of the outer frame 3b.

In this case, the vicinity of the end portion of the opening 27a of the inner frame 3a (flanged reflector plate 35a) abuts in the vicinity of the end portion of the light transmissive portion 11a to be fixed thereto. A portion of the outer frame 3b, which is bent in the flange shape, abuts on a lower portion of the bent light transmissive portion 11b to be fixed thereto. It should be noted that, in a plan view, in the LED lighting device 1f, the opening 27b of the outer frame 3b is formed in a same size as the opening 27a of the inner frame 3a. Also, the light extraction portion 9a is covered by the light transmissive portion 11a and the light extraction portion 9b is solely covered by the light transmissive portion 11b which is orthogonal to the light extraction portion 9a.

As a result, according to the seventh embodiment, similarly to the first embodiment, it makes it possible to extract, from the light extraction portion 9a, light in the opening face direction of the opening 27a of the inner frame 3a, and to extract, from the light extraction portion 9b, light in the side face direction intersecting with the opening face direction of the opening 27a of the inner frame 3a at a predetermined angle. When, as a representative configuration, the light transmissive portion 11a and the light transmissive portion 11b are orthogonal to each other, it makes it possible to extract, from the light extraction portion 9b, light in the opening face direction of the opening 27a of the inner frame 3a and in the side face direction orthogonal thereto.

According to the seventh embodiment, the similar advantages to those in the first embodiment can be obtained. As described above, according to the present invention, the vicinities of the edges of the inner frame 3a and the outer frame 3b may be bent in the flange shapes, respectively.

It should be noted that, also in the seventh embodiment, the LED lighting device 1f is provided with one recess portion of the inner frame 3a instead of two recess portions and one LED light source 23a is arranged at the inner frame 3a. In other words, the end portion of the outer frame 3b may be bent in the flange shape with respect to the first embodiment.

Even in the case in which one recess portion is formed, similar advantages to the seventh embodiment can be obtained. In other words, it makes it possible to extract, from the light extraction portion 9a, light in the opening face direction of the opening 27a of the inner frame 3a, and to extract, from the light extraction portion 9b, light in the opening face direction of the opening 27a of the inner frame 3a and the side face direction orthogonal thereto. When the light extraction portion 9b intersects with the opening face direction of the opening 27a of the inner frame 3a at a predetermined angle, it makes it possible to extract light in the side face direction intersecting with the opening face direction of the opening 27a of the inner frame 3a at a predetermined angle.

Eighth Embodiment

Figure 13:
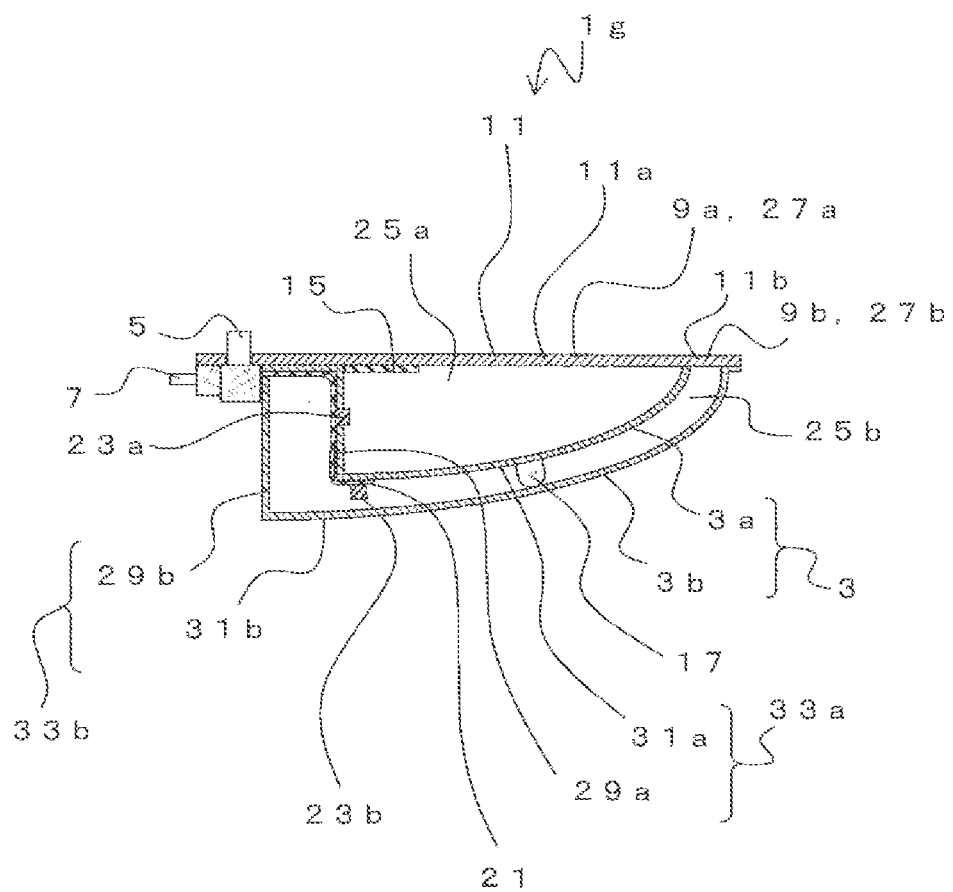
FIG. 13 is a cross-sectional view of an LED lighting device 1g.

Hereinafter, an eighth embodiment will be described. FIG. 13 is a cross-sectional view showing an LED lighting device 1g according to the eighth embodiment. The LED lighting device 1g is, similarly to the LED lighting device 1e, a lighting device in which the light extraction portions 9a and 9b are formed in the same direction.

Although the LED lighting device 1g has an approximately similar configuration to those in the LED lighting device 1, the LED lighting device 1g differs from the LED lighting device 1 in that the wiring is performed solely by the flexible flat cable 21 without the circuit board 19 being used. In the illustrative example in the drawings, a selector switch 5 and a terminal 7 are disposed outside the wall portion 29b of the outer frame 3b. The selector switch 5 is connected to the flexible flat cable 21.

In order to enhance the use efficiency of light, a reflective function layer is provided on a surface at the light guide space side of the flexible flat cable 21 so as to cover the flexible flat cable 21. It is preferable to provide a layer having a diffuse reflection function by use of the microcellular foam resin sheet or the like. Also, it is preferable that an LED element is directly mounted by soldering onto the flexible flat cable 21 and a portion onto which the LED element is mounted by the soldering is also covered by the reflective function layer.

In the LED lighting device 1g, two flexible flat cables 21 are used, which will be described in detail below. Here, the flexible flat cable 21 in which two wirings are formed is used. For example, at the predetermined position of one of the flexible flat cables 21, two LED light sources 23a are arranged, and at the other of the flexible flat cables 21, the LED light source 23b is arranged. The LED light sources 23a are connected to one flexible flat cable 21, and the LED light source 23b is connected to the other flexible flat cable 21, respectively.

In should be noted that, although the detail of the flexible flat cable 21 will be described later, the wiring 39 connecting the selector switch 5 to the LED light sources 23a is different from the wiring 39 connecting the selector switch 5 to the LED light source 23b. For this reason, it makes it possible to switch the respective circuits of the LED light sources 23a and 23b, respectively, by the selector switch 5.

As shown in FIG. 13, the flexible flat cables 21 are arranged along the inner frame 3a in the substantially centers in the width direction of the respective recess portions 33a of the inner frame 3a, respectively. The LED light sources 23a are exposed to the light guide spaces 25a through the holes formed in the wall portions 29a of the inner frame 3a. Also, the LED light source 23b, which is connected to the different flexible flat cable 21, is arranged in a rear face side in the vicinity of the boundary portion of the two recess portion 33a of the inner frame 3a to be arranged toward the surface side of the outer frame 3b.

With this configuration being used, return light of the irradiation light emitted from the LED light source 23a is not absorbed by the flexible flat cable 21 inside the inner frame 3a, and therefore it is possible to enhance the use efficiency of light. By forming a reflective layers on the respective surfaces of the flexible flat cables 21, which are exposed to the second light guide space, it makes it possible to prevent the irradiation light from being absorbed by the flexible flat cable 21 so as to similarly enhance the use efficiency of light.

According to the eighth embodiment, the similar advantages to those in the sixth embodiment can be obtained. Also, by wiring solely by use of the flexible flat cable 21, the structure can be simplified and an installation of the wiring can be facilitated.

The reflective function layer made from, for example, the microcellular foam resin is provided on the surface at the light guide space side of the flexible flat cable 21, and therefore the illumination light is substantially not absorbed by the wirings so as to prevent the use efficiency of the illumination light from being lowered. When used in the automotive interior illumination, it makes it possible to independently set the illumination color irradiating the interior and the illumination color irradiating a contour of the lighting device so as to enhance the dramatic effect by the interior illumination.

It should be noted that, also in the eighth embodiment, the LED lighting device 1g is provided with one recess portion of the inner frame 3a instead of two recess portions and one LED light source 23a is arranged at the inner frame 3a. In other words, the wiring is solely performed by the flexible flat cable 21 with respect to the second embodiment in which one recess portion is formed.

Even in this case, the selector switch 5 and the terminal 7 are disposed outside the wall portion 29b of the outer frame 3b. The selector switch 5 is connected to the flexible flat cable 21. Separate flexible flat cables 21 may be used for the LED light sources 23a of the inner frame and the LED light source 23b of the outer frame, respectively. However, by use the common wirings, it makes it possible to make the wiring to be more efficient.

Figure 14:
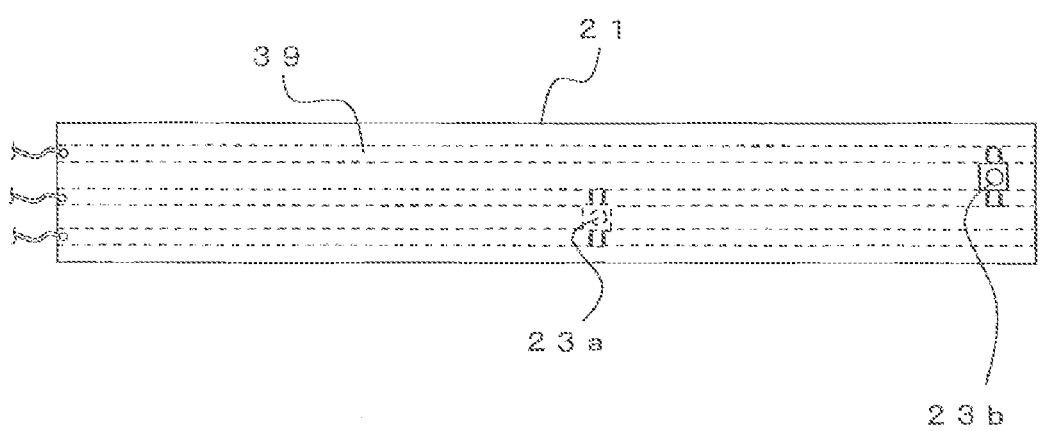
FIG. 14 is a view showing a flexible flat cable 21.

FIG. 14 is a view showing a flexible flat cable 21. Three wirings 39 are formed on the flexible flat cable 21. At the predetermined positions on the flexible flat cable 21, the LED light sources 23a and 23b are arranged to be spaced from each other. The LED light sources 23a and 23b are connected to the wiring 39, respectively. It should be noted that the LED sources 23a and 23b are connected to the surface of the flexible flat cable 21 in the opposite direction each other. In other words, the LED light sources 23a and 23b are spaced apart from each other at the predetermined distance and connected to the wiring face of the wiring 39 in the opposite direction each other.

In this case, the common wiring is shared between the wiring 39 connecting the selector switch 5 to the LED light sources 23a and the wiring 39 connected the selector switch 5 to the LED light source 23b. More particularly, one of the three wirings 39 is shared to connect the respective ones. The selector switch 5 switches the respective circuits of the LED light sources 23a and 23b.

Also, the flexible flat cable 21 (common wiring) is arranged along the inner frame 3a in the substantially center in the width direction of the recess portions 33a of the inner frame 3a. The LED light sources 23a are exposed to the light guide spaces 25a through the holes formed in the wall portions 29a of the inner frame 3a, respectively. The LED light source 23b is disposed on the rear face side of the recess portion 33a of the inner frame 3a and arranged toward the surface side of the outer frame 3b.

With the above configuration being used, similar advantages to those in the eighth embodiment can be obtained. In other words, by wiring solely by use of the flexible flat cable 21, the structure can be simplified and an installation of the wiring can be facilitated. In particular, by using the common wirings, the structure can be simplified.

As the reflective function layer is provided on the flexible flat cable 21, it prevents the illumination light from being absorbed by the wiring so as to prevent the use efficiency of the illumination light from being lowered. In other words, it makes it possible to similarly enhance the use efficiency of the illumination light because the absorption of the illumination light by the flexible flat cable 21 can be prevented.

Ninth Embodiment

Figure 15:
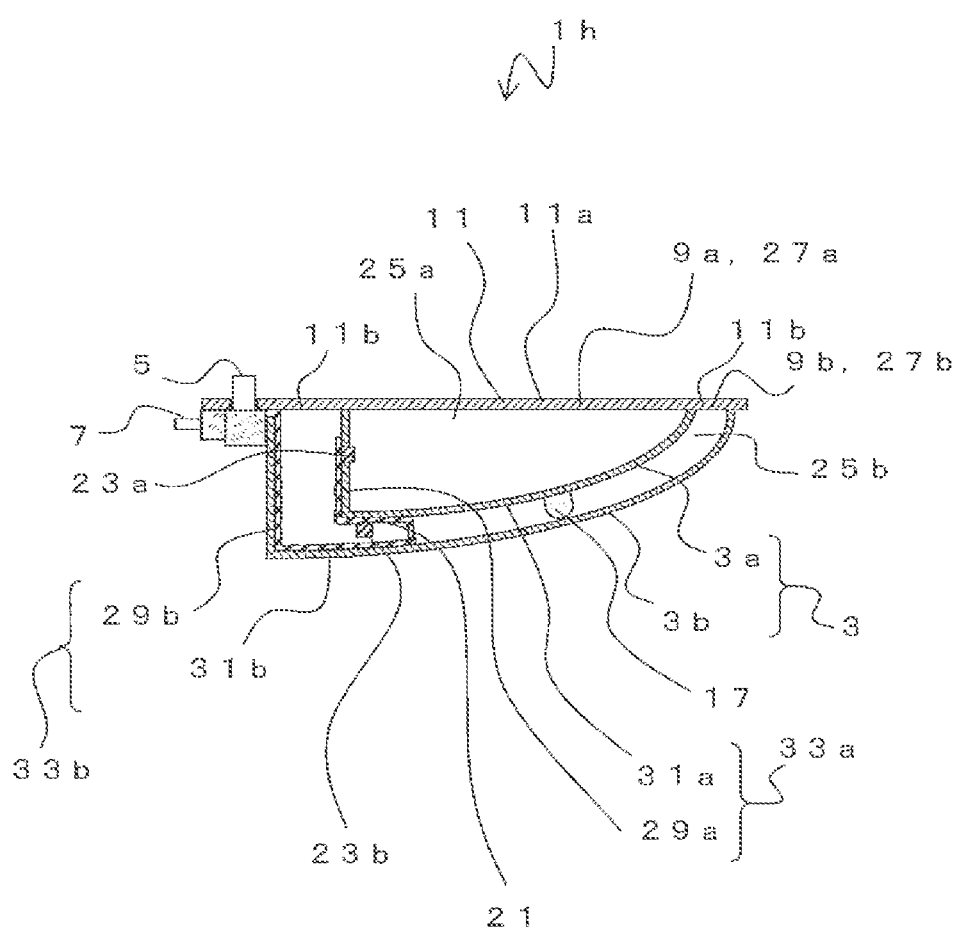
FIG. 15 is a cross-sectional view of an LED lighting device 1h.

Hereinafter, a ninth embodiment will be described. FIG. 15 is a cross-sectional view of an LED lighting device 1h according to the ninth embodiment. Although the LED lighting device 1h has an approximately similar configuration to those in the LED lighting device 1, the LED lighting device 1h differs from the LED lighting device 1 in that one recess portion 33a of the inner frame 3a is provided instead of two recess portions and the inner frame 3a and the outer frame 3b are formed separately.

The LED lighting device 1h has one recess portion 33a of the inner frame 3a and one LED light source 23a arranged in the inner frame 3a. Thus, one LED light source 23a of the inner frame 3a is connected to the flexible flat cable 21. Also, the LED lighting device 1h is a lighting device in which, similarly to the LED lighting device 1g, light extraction portions 9a and 9b are formed toward the same direction.

In the LED lighting device 1h, similarly to the LED lighting device 1g, the wiring is performed solely by the flexible flat cable 21 without the circuit board 19 being used. In addition, in the LED lighting device 1h, the selector switch 5 and the terminal 7 are disposed outside the wall portion 29b of the outer frame 3b. The selector switch 5 is connected to the flexible flat cable 21.

In the LED lighting device 1h, unlike the LED lighting device 1g and the like, the inner frame 3a and the outer frame 3b are not integrally formed and not formed by bending the hinge portion, but the inner frame 3a and the outer frame 3b are separately arranged to be spaced apart from each other. The protrusion portion 17 is provided on the rear face of the inner frame 3a. By adhering to each of the opposing faces via the protrusion portion 17, the inner frame 3a and the outer frame 3b are capable of maintaining the gap therebetween in a stable manner.

The LED lighting device 1h does not have a joining portion to join the outer frame 3b in the outer circumference of the inner frame 3a. In other words, the light extraction portion 9b is formed to surround an entire circumference of the light extraction portion 9a. Also, as the selector switch 5 and the terminal 7 and the like are disposed outside the outer frame 3b, light is prevented from being shielded by the selector switch 5 or the like.

It should be noted that the LED lighting device 1h does not use the light transmission preventive member 15. Also, a normal electric cable may be used instead of the flexible flat cable 21.

According to the ninth embodiment, similar advantages to those in the sixth embodiment can be obtained. Also, as the light extraction portion 9b is formed so as to surround the entire circumference of the light extraction portion 9a, it makes it possible to obtain a lighting device that is capable of extracting light from the entire outer circumference of the inner frame 3a.

By using the protrusion portion 17, it makes it possible to stabilize the arrangement of the inner frame 3a and the outer frame 3b. For this reason, it makes it possible to form the light extraction portion 9b in the entire outer circumference of the inner frame 3a in an assured manner. It should be noted that the LED light source 23b is preferably arranged at a position that is invisible from the light extraction portion 9b.

According to the LED lighting device 1h, the selector switch 5 and the terminal 7 are disposed outside the wall portion 29b of the outer frame 3b. For this reason, when extracting light from the light guide space 25b, which are surrounded by the openings of the inner frame 3a and the outer frame 3b, it prevents those components from shielding or absorbing light from the LED light source 23b so as to extract light from the entire outer circumference of the inner frame 3a.

The flexible flat cable 21, which is connected to the selector switch 5 disposed outside the wall portion 29b of the outer frame 3b, is, for example, wired along an inner surface of the recess portion 33b of the outer frame 3b from the wall portion 29b toward the curved portion 31b, risen therefrom toward the rear face of the inner frame, runs through the rear face of the inner frame 3a, is connected to the LED light source 23b, which is arranged on the rear face of the curved face portion 31a of the inner frame 3a distant from the rising position at a predetermined distance, further runs through the wall portion 29a on the rear face of the inner frame 3a, and is connected to the LED light source 23a arranged at the opening of the wall portion 29a of the inner frame 3a. It should be noted that the wiring pathway of the flexible flat cable 21 is not limited to those illustrated in the drawings.

In order to enhance the use efficiency of light, on the surface at the light guide space side of the flexible flat cable 21, it is preferable to provide a layer having the diffuse reflection function by use of, for example, the microcellular foam resin sheet. Also, an LED element is preferably to be directly mounted by soldering onto the flexible flat cable 21, and a portion onto which the LED element is mounted by soldering is also preferably coated by the reflective function layer.

When the LED lighting device 1h is used for the automotive interior illumination, not only independently setting the illumination color irradiating the interior and the illumination color irradiating the contour of the lighting device but also light can be extracted from the entire outer circumference of the inner frame 3a so as to further enhance the dramatic effect by use of the interior illumination.

Tenth Embodiment

Figure 16:
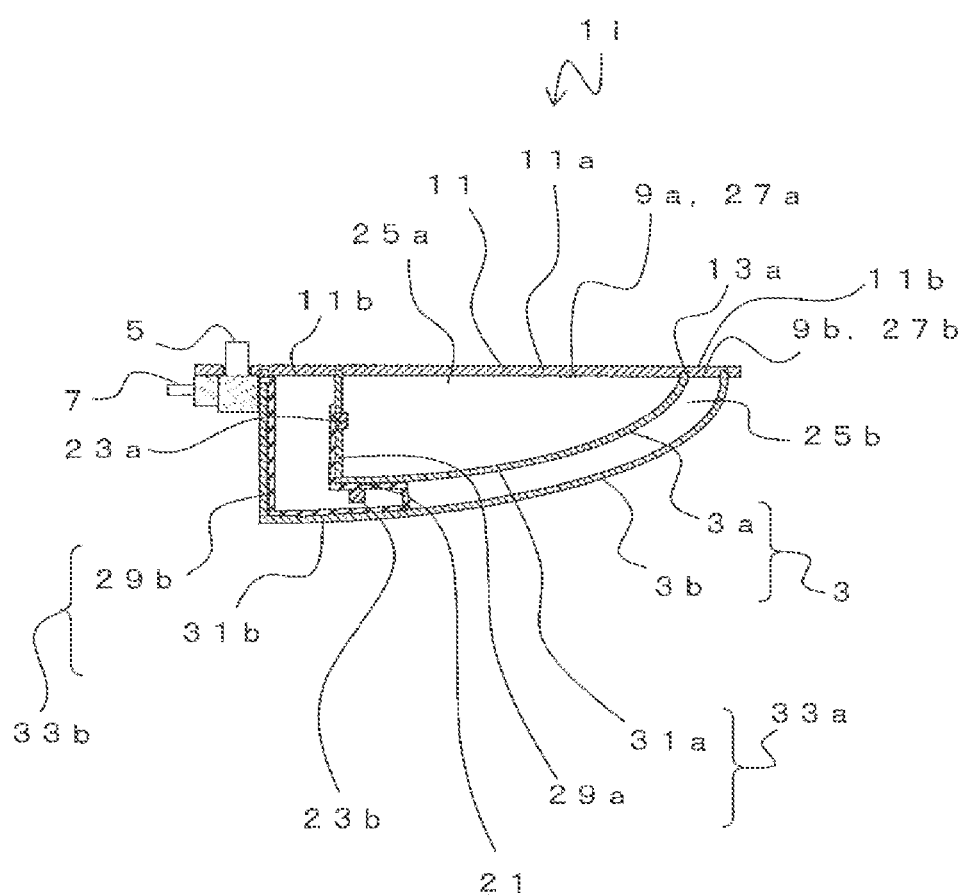
FIG. 16 is a cross-sectional view of an LED lighting device 1i.

Hereinafter, a tenth embodiment will be described. FIG. 16 is a cross-sectional view showing an LED lighting device 1i according to the tenth embodiment. Although the LED lighting device 1i has an approximately similar configuration to those in the LED lighting device 1h, the LED lighting device 1i differs from the LED lighting device 1h in that the protrusion portion 17 is not provided.

The LED lighting device 1i is a lighting device in which, similarly to the LED lighting device 1h, the light extraction portions 9a and 9b are formed toward the same direction. Also, in the LED lighting device 1i, similarly to the LED lighting device 1h, the inner frame 3a and the outer frame 3b are formed separately and arranged to be spaced apart from each other.

At a contacting portion of the light transmissive member 11 with the front edge of the inner frame 3a (edge of the opening 27a) and a contacting portion of the light transmissive member 11 with the front edge of the outer frame 3b (edge of the opening 27b), grooves 13a are provided, respectively. In other words, the grooves 13a are formed in an annular shape so as to correspond to the front edge of the inner frame 3a, and further outside thereof, formed in an annular shape so as to correspond to the front edge of the outer frame 3b.

The vicinities of the front edges of the respective openings 27a and 27b of the inner frame 3a and the outer frame 3b are fit into the groove 13a formed on the light transmissive member 11 to be supported therewith. It should be noted that the vicinities of the front edges of the openings 27a and 27b of the inner frame 3a and the outer frame 3b may be further adhered to the groove 13a.

In the LED lighting device 1i, similarly to the LED lighting device 1h, the wiring is performed solely by the flexible flat cable 21 and in addition the selector switch 5 and the terminal 7 are arranged. Further, connecting the selector switch 5 to the flexible flat cable 21 is similar to those in the LED lighting device 1h. Also, the wiring pathway of the flexible flat cable 21 connecting the selector switch 5 to the LED light sources 23a and 23b may be similar to those in the LED lighting device 1h.

According to the tenth embodiment, similar advantages to those in the ninth embodiment can be obtained. In addition, when the inner frame 3a and the outer frame 3b are arranged to be spaced apart from each other, it makes it possible to stabilize the arrangement of both frames. For this reason, it makes it possible to form the light extraction portion 9b in an entire outer circumference of the inner frame 3a. As a result, it makes it possible to obtain a lighting device that is capable of extracting light from the entire outer circumference of the inner frame 3a. It should be noted that the LED light source 23b is preferably arranged at a position that is invisible from the second light extraction portion 9b.

Eleventh Embodiment

Figure 17:
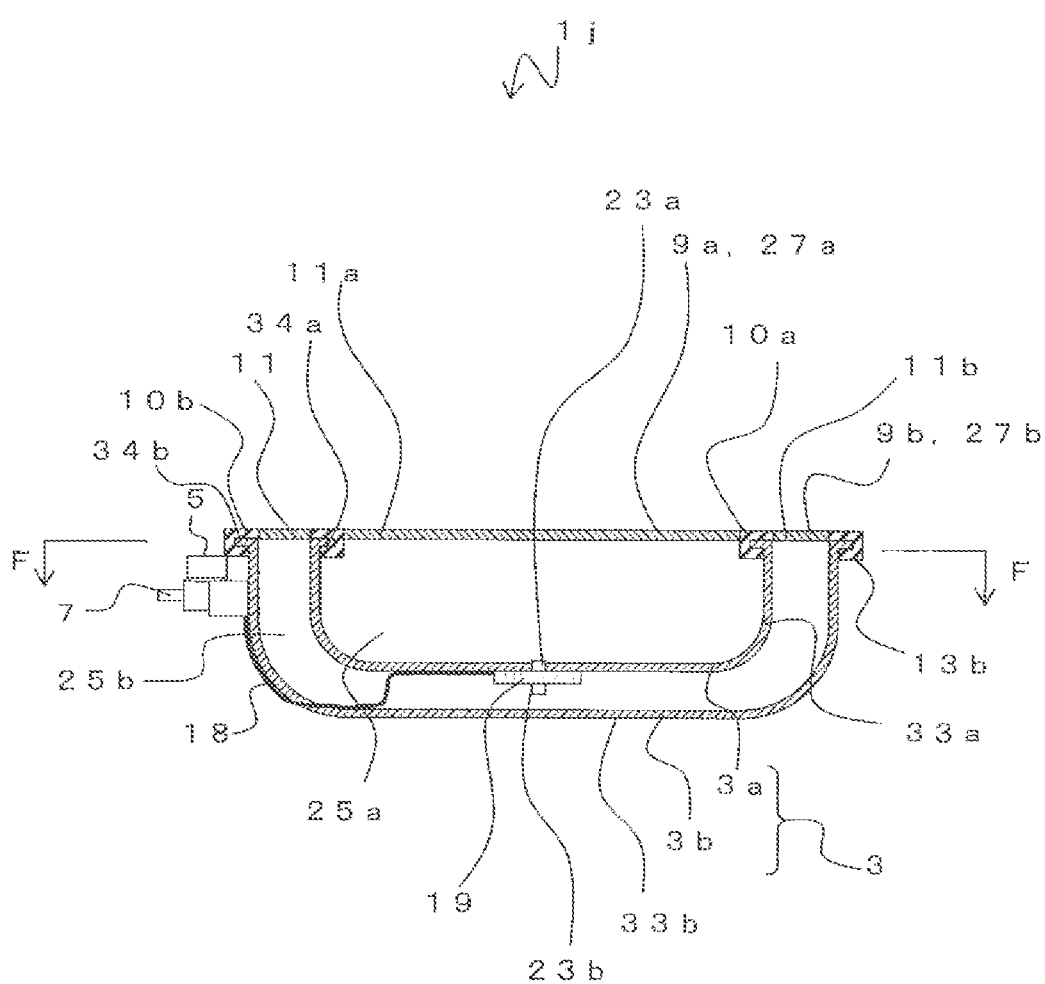
FIG. 17 is a cross-sectional view of the LED lighting device 1j taken along the line G-G in FIG. 18.
Figure 18:
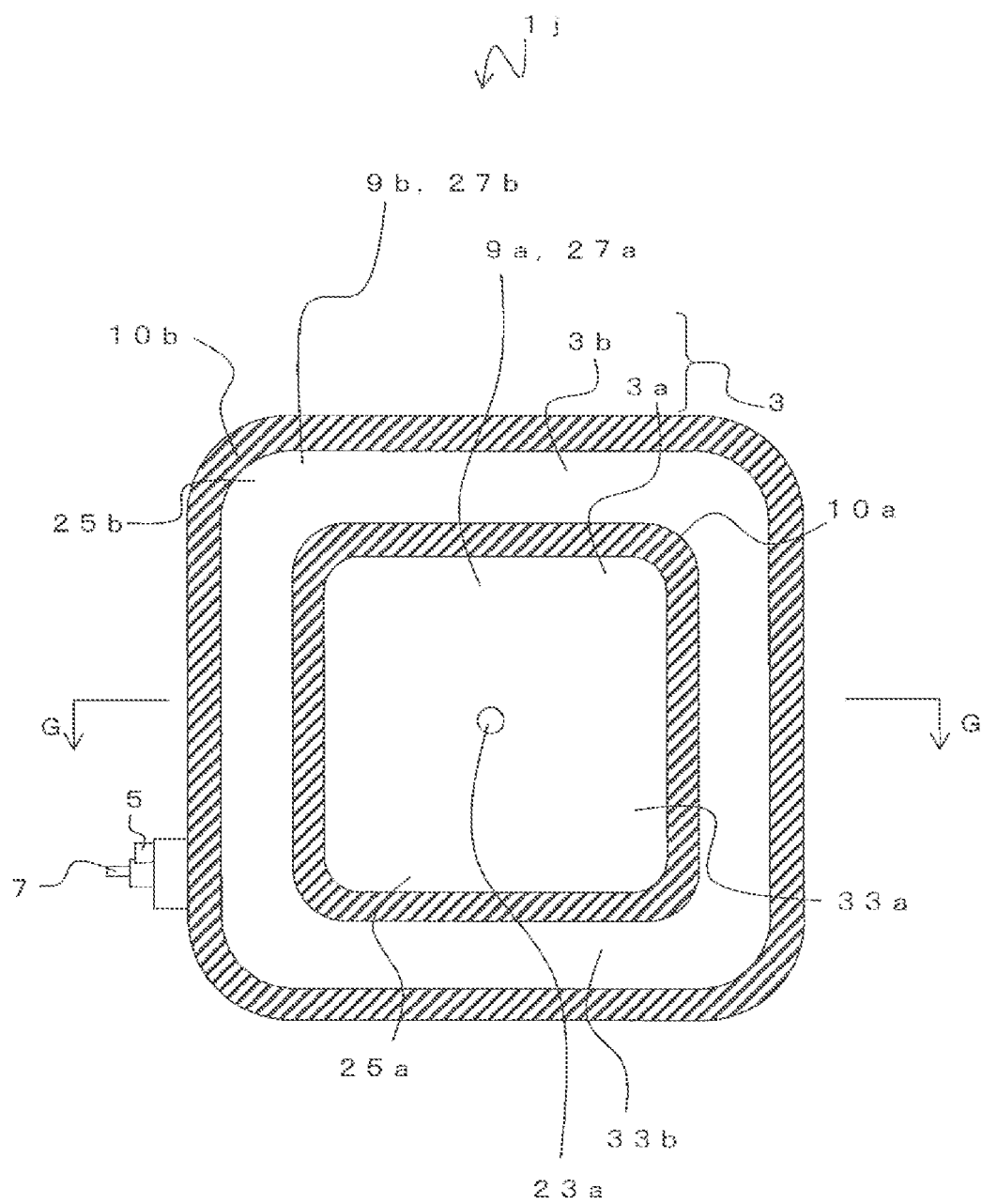
FIG. 18 is a cross-sectional view of the LED lighting device 1j taken along the line F-F in FIG. 17.

Hereinafter, an eleventh embodiment will be described. FIGS. 17 and 18 are cross-sectional views showing an LED lighting device 1j according to the eleventh embodiment. FIG. 17 is a cross-sectional view taken along the line G-G in the FIG. 18, and FIG. 18 is a cross-sectional view taken along the line F-F in FIG. 17. Although the LED lighting device 1j has an approximately similar configuration to those in the LED lighting device 1i and the like, the LED lighting device 1j differs from the LED lighting device 1i and the like in that an inner frame member 10a and an outer frame member 10b are used.

The LED lighting device 1j is a lighting device in which, similarly to the LED lighting device 1i, the light extraction portion 9a and 9b are formed toward the same direction. Also, in the LED lighting device 1j, similarly to the LED lighting device 1i, the inner frame 3a and the outer frame 3b are formed separately and arranged to be spaced apart from each other.

In the LED lighting device 1j, in a plan view, both of the inner frame 3a and the outer frame 3b are formed in a substantially cuboid shape having corner portions each having a round bottom portion and a side face portion. The inner frame 3a has a substantially similar figure to the outer frame 3b, and the inner frame 3a is arranged in the substantially center of the outer frame 3b. The inner frame 3a and the outer frame 3b are arranged in a state to be spaced from each other at a prescribed distance at any position thereof. Accordingly, the light extraction portion 9b is formed in an entire outer circumference of the inner frame 3a.

Flange portions 34a and 34b are provided in the vicinities of the front edges of the respective openings 27a and 27b of the inner frame 3a and the outer frame 3b. The flange portions 34a and 34b are fit into grooves 13b formed on the inner frame member 10a and the outer frame member 10b, respectively. In this case, the inner frame member 10a and the outer frame member 10b are, for example, injection molded components made of colored resin, respectively. It should be noted that upper faces of the inner frame member 10a and the outer frame member 10b are formed on the same plane each other.

The shapes of the inner frame member 10a and the outer frame member 10b corresponds to the shapes of respective openings 27a and 27b of the inner frame 3a and the outer frame 3b, respectively. Accordingly, in the LED lighting device 1j, in a plan view, the inner frame member 10a has a substantially similar figure to the outer frame member 10b, and the inner frame member 10a is arranged in the substantially center of the outer frame member 10b. For this reason, inside the inner frame member 10a serves as the light extraction portion 9a, and the light extraction portion 9b is formed in an entire outer circumference of the inner frame member 10a.

Inside the inner frame member 10a, the light transmissive member 11 is provided so to as cover the light extraction portion 9a. Also, between the inner frame member 10a and the outer frame member 10b, the light transmissive member 11 is provided so as to cover the light extraction portion 9b. A portion covering the light extraction portion 9a servers as the light transmissive portion 11a, and a portion covering the light extraction portion 9b serves as the light transmissive portion 11b. In other words, the light transmissive portion 11a is fixed to inside the inner frame member 10a and the light transmissive portion 11b is fixed between the inner frame member 10a and the outer frame member 10b. With such configuration being used, it makes it possible to fix the inner frame 3a and the outer frame 3b in a stable manner in a state to be spaced apart from each other at a predetermined distance.

The LED light source 23a is disposed in the substantially center of the surface of the bottom portion of the inner frame 3a. The LED light source 23b is disposed on the rear face of the inner frame 3a and at an opposite side of the LED light source 23b such that the light emitting face thereof is directed toward the surface side of the outer frame 3b. The circuit board 19 is provided on the rear face of the inner frame 3a, and the LED light source 23a and the LED light source 23b are symmetrically arranged to each other with respect to the circuit board 19. By arranging the LED light source 23a and the LED light source 23b in this way, it makes it possible to extract light from the light guide space 25b from an entire outer circumference of the inner frame 3a surrounded by the openings of the inner frame 3a and the outer frame 3b.

In this case, the light transmission preventive member 15 having a higher light reflectivity may be provided in the substantially center of the light transmissive member 11 of the light extracting portion 9a of the inner frame 3a. Also, instead of providing the light transmission preventive member 15, the prism structure may be formed on the surface or the rear face of the substantially center portion of the light transmissive member 11 so as to diffuse the direct irradiation light thereby eliminating the glare.

Here, the wiring 18, which connects the circuit board 19 to the selector switch 5, is, for example, wired from the selector switch 5 along the outer circumference of the side face of the outer frame 3b, to open a hole to allow the wiring 18 to penetrate the outer frame 3b to insert the wiring 18 into the outer frame, allows the wiring 18 to run through the surface of the bottom face portion inside the outer frame 3b, and risen in the middle thereof on the rear face of the inner frame 3a to be connected to the circuit board 19.

In this case, preferably, a layer having a diffuse reflection function may be provided at a portion along which the wiring 18 runs on the surface of the bottom face portion of the outer frame 3b. By doing this, it makes it possible to improve the reflection efficiency of light of the LED lighting device 1j and to prevent the wiring 18 from absorbing heat. Also, as the wiring 18, other than the normal wirings, the flexible flat cable 21 may be used as well.

Here, in the LED lighting device 1i and the LED lighting device 1j, the selector switch 5 and the terminal 7 are disposed outside of the wall portion 29b of the outer frame 3b. For this reason, when extracting light of the light guide space 25b from the light extraction portion 9b surrounded by the openings of the inner frame 3a and the outer frame 3b, light from the LED light source 23b is prevented from being shielded or absorbed by those components so as to extract light from an entire outer circumference of the inner frame 3a.

According to the eleventh embodiment, the similar advantages to those in the ninth embodiment can be obtained. In addition, it makes it possible to stabilize the arrangement of both frames and to form the light extraction portion 9b in the entire outer circumference of the inner frame 3a. As a result, it makes it possible to obtain a lighting device that is capable of extracting light from the entire outer circumference of the inner frame 3a.

Twelfth Embodiment

Figure 19:
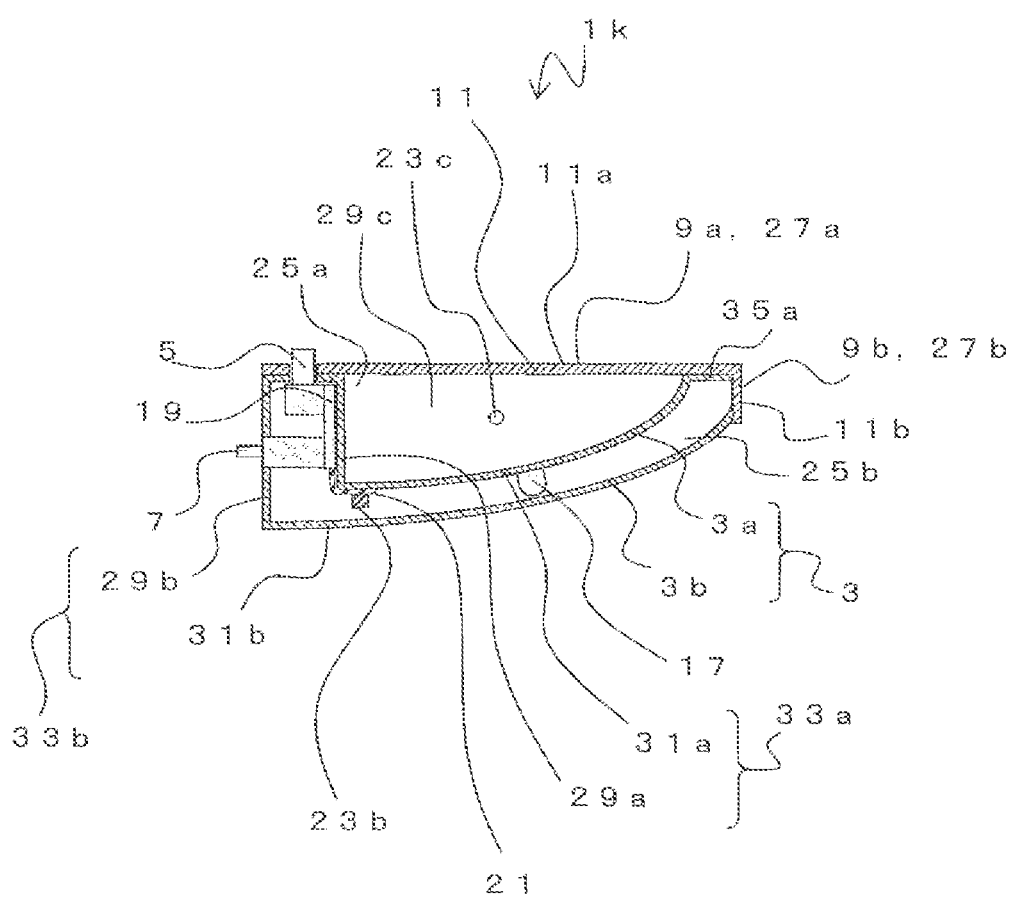
FIG. 19 is a cross-sectional view of an LED lighting device 1k.
Figure 20:
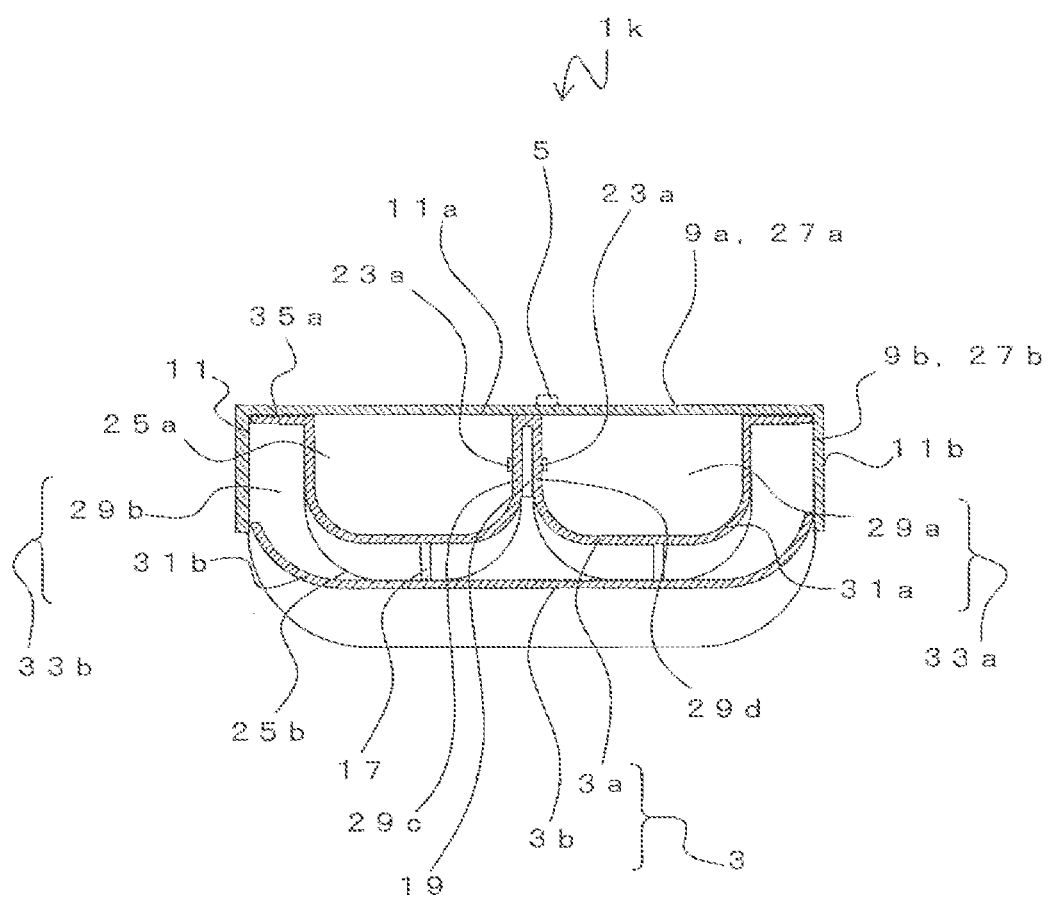
FIG. 20 is a cross-sectional view of the LED lighting device 1k.

Hereinafter, a twelfth embodiment will be described. FIGS. 19 and 20 are cross-sectional views showing an LED lighting device 1k according to the twelfth embodiment. Although the LED lighting device 1k has an approximately similar configuration to those in the LED lighting device 1, the LED lighting device 1k differs from the LED lighting device 1 in that an arrangement of the LED light sources 23a differs.

In the LED lighting device 1k, the inner frame 3a has two recess portions 33a formed integrally, and the circuit board 19 is sandwiched between the wall portions 29c and 29d of the recess portions 33a, neighboring to each other, of the inner frame 3a. In other words, the wall portions 29c and 29d are arranged to be opposed each other with respect to the circuit board 19. Respective wall portions 29c and 29d, which are neighbored and opposed to each other, are formed substantially perpendicular to the respective openings 27a of the inner frame 3a. Here, although the circuit board 19 is used, the flexible flat cable 21 may be also used.

Through holes are provided in the substantially center of the wall portions 29c and 29d. The LED light sources 23a are arranged in respective through holes of the wall portions 29c and 29d substantially perpendicular to the opening 27a. Accordingly, the LED light sources 23a are arranged at the respective wall portions 29c and 29d of the recess portions 33a of the inner frame 3a, respectively, with the light emitting faces being directed in the opposite direction to each other.

In other words, the LED light sources 23a are respectively provided at the wall portions 29c and 29d toward the inner face side of the inner frame 3a. The LED light sources 23a are connected to the circuit board 19 arranged between the wall portions 29c and 29d, respectively. The LED light sources 23a are capable of emitting light toward the respective light guide spaces 25a of the inner frame 3a. It should be noted that the LED light sources 23a may be provided at a portion other than the wall portions 29c and 29d and may be provided at any position on the surface side inside the inner frame 3a.

According to the twelfth embodiment, similar advantages to those in the first embodiment can be obtained. In addition, by providing a pair of inner frames 3a, it makes it possible to use the LED lighting device as an illumination for irradiating particular different portions, respectively, with the light from respective light extraction portions 9a.

Thirteenth Embodiment

Figure 21:
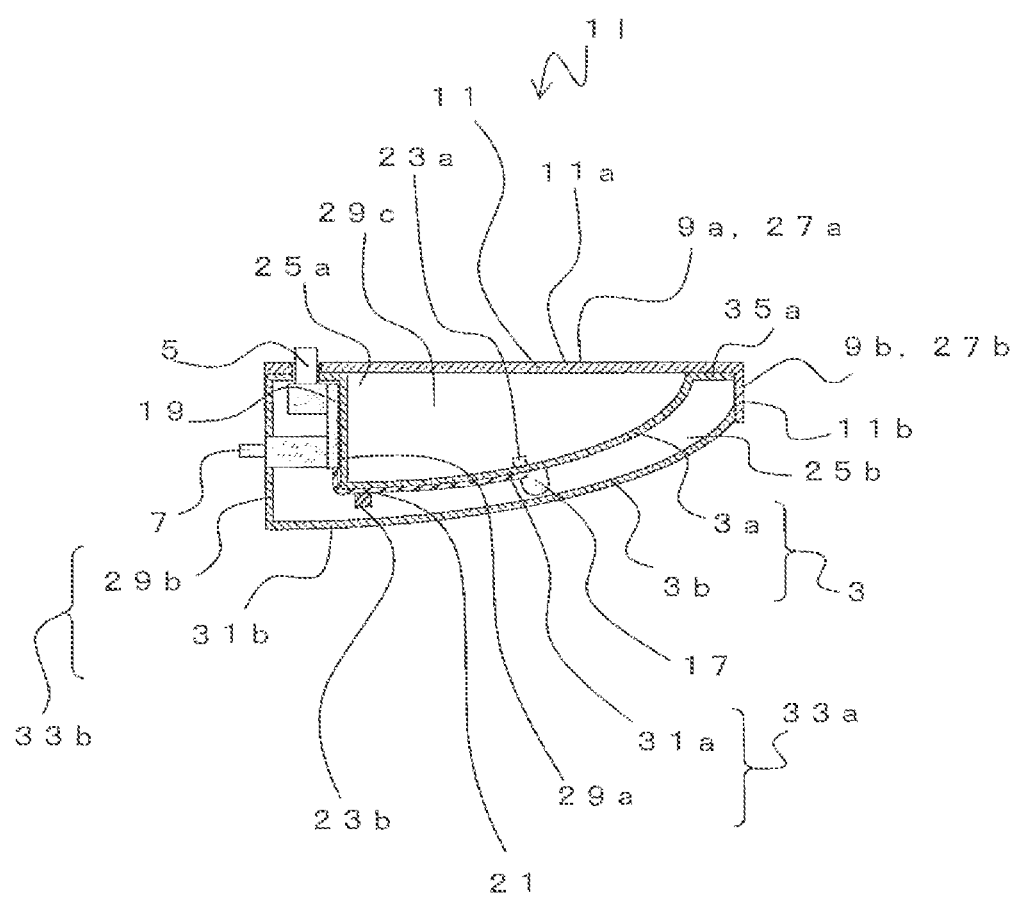
FIG. 21 is a cross-sectional view of an LED lighting device 1l.
Figure 22:
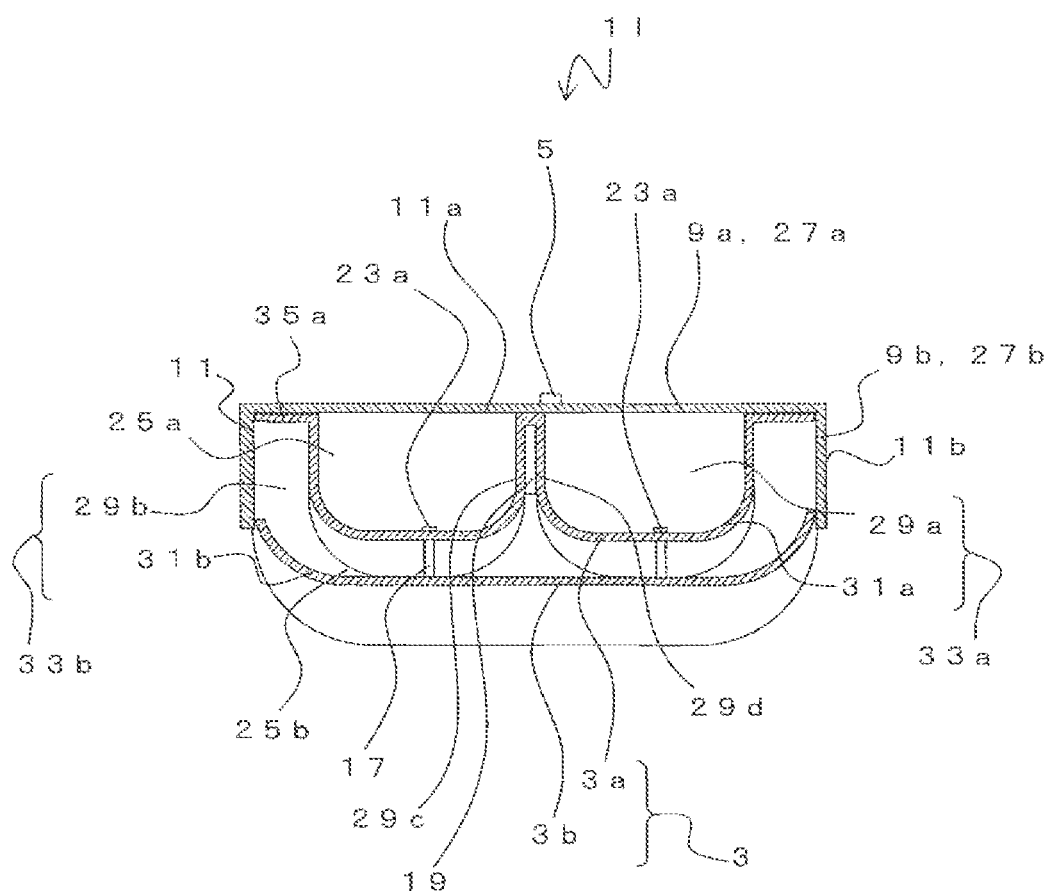
FIG. 22 is a cross-sectional view of the LED lighting device 1l.

FIGS. 21 and 22 show an LED lighting device 1l according to a thirteenth embodiment. In the LED lighting device 1l, the inner frame 3a has two recess portions formed integrally. Although the LED lighting device 1l has an approximately similar configuration to those in the LED lighting device 1, the LED lighting device 1l differs from the LED lighting device 1 in that an arrangement of the LED light sources 23a differs.

In the LED lighting device 1l, the LED light sources 23a are provided at the curved face portions 31a of the inner frame 3a, respectively. For example, the LED light sources 23a are arranged in the substantially center of the curved face portions 31a of two recess portions 33a of the inner frame 3a, respectively, and emit light toward the openings 27a in the same direction inside the inner frame 3a, respectively. It should be noted that the vicinities of portions in which the LED light sources 23a are arranged in the curved face portions of the inner frame may be substantially on the plane.

The LED light sources 23a are connected to the flexible flat cable 21 in the rear face side of the inner frame 3a, respectively. Also, the light emitting portions of the LED light source 23a are exposed to the light guide space 25a through the holes provided in the inner frame 3a, respectively.

Here, the LED light sources 23a are arranged such that the light emission direction of the LED light source 23a is directed to the normal line of the opening face of the opening 27a of the inner frame 3a. In this case, when the light distribution of a half angle of the LED light source 23a is equal to or less than 60 degrees, then, when used for the ceiling illumination of the automotive interior, it makes it possible to keep the illuminance on the irradiation surface in the narrow interior space of the vehicle. Furthermore, more preferably, the irradiation of a half angle is equal to or less than 50 degrees.

In this case, a number of prism shapes may be formed or a prism sheet on which a number of prisms are formed may be stuck on the surface or the rear face of the light transmissive member 11 (light transmissive portion 11a), which covers the light extraction portion 9a of the inner frame 3a, in order to reduce the glare due to the irradiation light directly irradiated from the LED light source 23a.

According to the thirteenth embodiment, similar advantages to those in the first embodiment can be obtained. In this way, as long as the light emitting portion of the LED light source 23a is arranged in the light guide space 25a, the LED light source 23a may be arranged at any position in the inner frame 3a.

Figure 23:
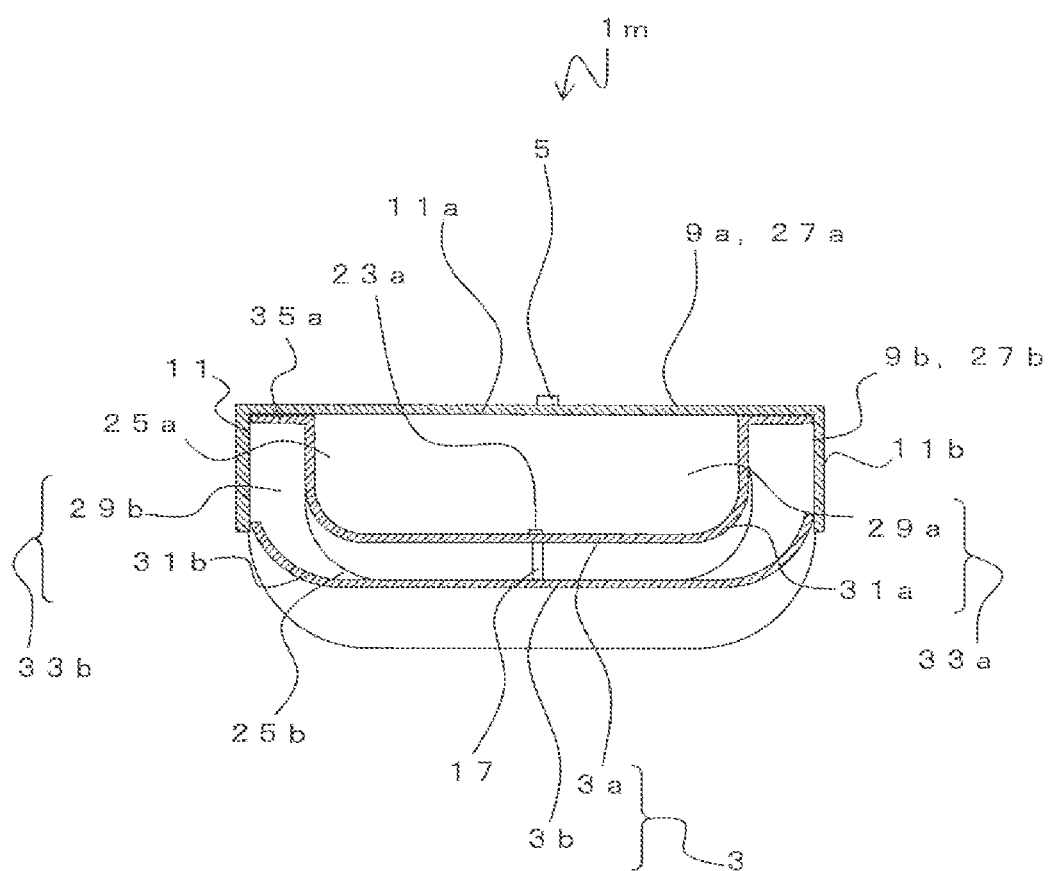
FIG. 23 is a cross-sectional view of an LED lighting device 1m.

It should be noted that, also in the thirteenth embodiment, the LED lighting device 1l is provided with one recess portion of the inner frame 3a instead of two recess portions and one LED light source 23a is arranged at the inner frame 3a. FIG. 23 is a view showing an LED lighting device 1m.

The LED lighting device 1m has one recess portion 33a of the inner frame 3a with respect to the LED lighting device 1l. In this case, the LED light source 23a is arranged in the substantially center of the curved face portion 31a of the inner frame 3a. It should be noted that the LED light source 23a is connected to the flexible flat cable 21 on the rear face side of the inner frame 3a. Also, the light emitting portion of the LED light source 23a is exposed to the light guide space 25a through the hole provided in the inner frame 3a.

By doing this, also the similar advantages to those in the LED lighting device 1l can be obtained. In other words, it makes it possible to extract, from the light extraction portion 9a, light in the opening face direction of the opening 27a of the inner frame 3a, and to extract, from the light extraction portion 9b, light in the opening face direction of the opening 27a of the inner frame 3a and the side face direction orthogonal thereto. When the light extraction portion 9b intersects with the opening face direction of the opening 27a of the inner frame 3a at a predetermined angle, it makes it possible to extract light from the side face direction intersecting with the opening face direction of the opening 27a of the inner frame 3a at a predetermined angle.

Fourteenth Embodiment

Figure 24:
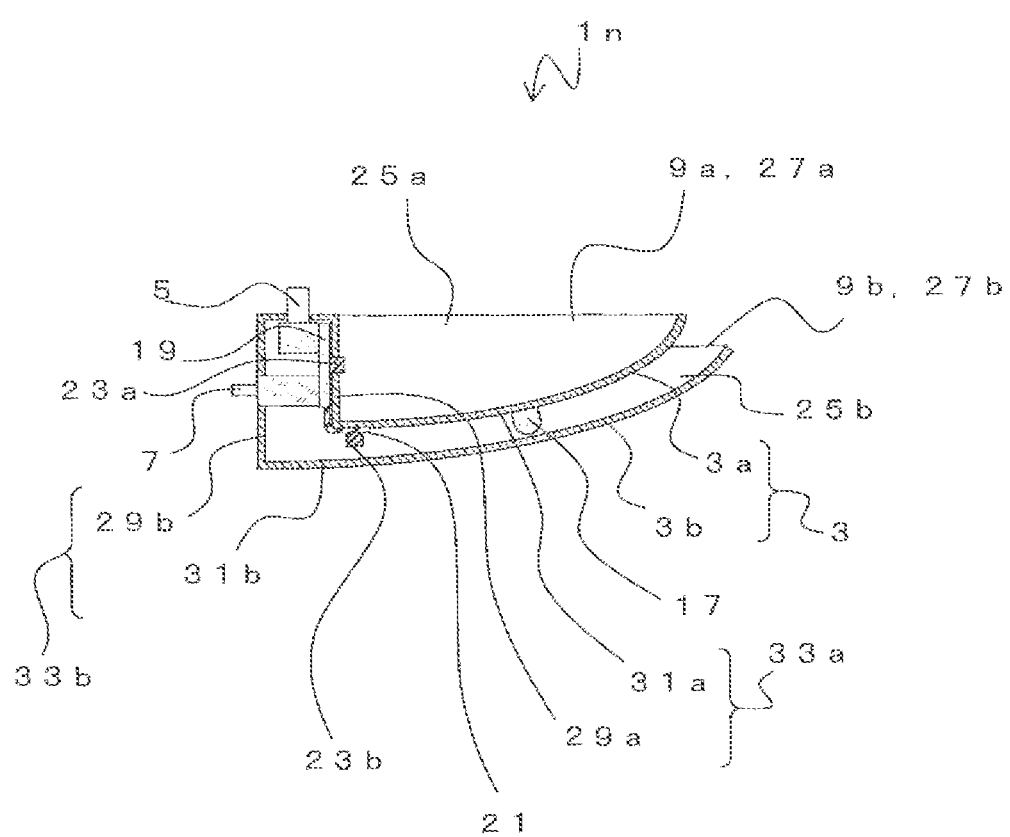
FIG. 24 is a cross-sectional view of an LED lighting device 1n.

Hereinafter, a fourteenth embodiment will be described. FIG. 24 is a cross-sectional view showing an LED lighting device 1n according to the fourteenth embodiment. Although the LED lighting device 1n has an approximately similar configuration to those in the LED lighting device 1d shown in FIG. 10, the LED lighting device 1n differs from the LED lighting device 1d in that the light transmissive member 11 or the like is not used.

In other words, in the LED lighting device 1n shown in FIG. 24, the opening 27b of the outer frame 3b is formed at a lower portion in the thickness direction (backward) adjacent to the inner frame 3a outside of the opening 27a of the inner frame 3a. With this configuration being used, also, it makes it possible to extract, from the light extraction portion 9a, light from the light guide space 25a (LED light source 23a) and to extract, from the light extraction portion 9b, light from the light guide space 25b (LED light source 23b), respectively. In other words, it makes it possible to extract light form the LED light source 23b in the direction from the opening face direction of the inner frame 3a toward the outer circumferential direction of the inner frame 3a.

In the LED lighting devices 1a and 1 b or the like, light is extracted solely from the light extraction portion 9b at the side of the respective LED lighting devices. On the other hand, light from the light extraction portion 9b of the LED lighting device 1n can be extracted, similarly to the LED lighting devices 1c and 1d and the like, in the direction ranging from the same direction as the light extraction portion 9a up to the range at the predetermined angle (for example, a perpendicular direction) from the light extraction portion 9a.

Although, in a plan view, an example in which the opening 27b of the outer frame 3b is formed such that the opening 27b is spread outwardly from the opening 27a of the inner frame 3a, a size of the opening 27b of the outer frame 3b is not limited thereto. For example, the size of the opening 27b of the outer frame 3b is not necessarily formed to be larger than the opening 27a of the inner frame 3a, and may be formed in the same size each other.

According to the fourteenth embodiment, the similar advantages to those in the first embodiment can be obtained. In this way, according to this embodiment, it makes it possible to extract, from the light extraction portion 9a, light in the opening face direction of the opening 27a of the inner frame 3a, and to extract, from the light extraction portion 9b, in two directions, that is, the opening face direction of the opening 27a of the inner frame 3a and the different direction therefrom.

A position of the light extraction portion 9b can be freely determined with respect to the light extraction portion 9a. Thus, the light extraction portion 9b may be formed such that light from the light extraction portion 9a and light from the light extraction portion 9b are extracted as illumination light in the directions perpendicular to each other, or alternatively, the light from the light extraction portion 9b and light extraction portion 9a are extracted as illumination light in the same direction each other. In other words, it makes it possible to extract light in the direction at a predetermined angle with respect to the light extraction portion 9a including the light extracting direction from the light extraction portion 9a and the direction at the predetermined angle with respect to the light extraction portion 9a.

As a result, according to the fourteenth embodiment, similarly to the first embodiment, it makes it possible to extract, form the light extraction portion 9a, light in the perpendicular to the opening 27a of the inner frame 3a, and to extract, from the light extraction portion 9b, light in the range from the direction of the opening 27a of the inner frame 3a to the side face direction intersecting with the opening face direction at the predetermined angle by adjusting the position of the light extraction portion 9b.

It makes it possible to obtain a method of extracting light using an LED lighting device that extracts, from the light extraction portion 9a, light in the opening face direction of the opening 27a of the inner frame 3a, and extracts, from the light extraction portion 9b, light in the direction including at least either the opening face direction of the opening 27a of the inner frame 3a or the side face direction intersecting with the opening face direction at the predetermined angle.

Here, although not shown in the drawings, when the opening 27b of the outer frame 3b is larger than the opening 27a of the inner frame 3a and further the opening 27b of the outer frame 3b is formed on the same plane with the opening of the inner frame 3a, it is needless to say that the light extraction portion 9a and the outer frame 3b are both capable of extracting light in the direction perpendicular to the opening 27a of the inner frame 3a.

It should be noted that, also in the fourteenth embodiment, the LED lighting device 1n is provided with one recess portion of the inner frame 3a instead of two recess portions and one LED light source 23a is arranged at the inner frame 3a. By doing this, also the similar advantages to those in the fourteenth embodiment can be obtained.

As described above, while certain embodiments of the present invention have been described referring to the accompanying drawings, the technical scope of the present invention is not intended to be limited to those described in the above-described embodiments. It is apparent that the person skilled in the art would conceive various changes and modifications without departing from the spirit and technical idea recited in the appended claims, and it should be appreciated that such changes and modifications naturally belong to the technical scope of the present invention.

For example, it is needless to say the above-described embodiments can be combined one another, respectively.

Also, a layout of the selector switch 5, circuit board 19 or the flexible flat cable 21 or the like is not limited to those illustrated in the drawings.

The invention claimed is:

1. An LED lighting device, comprising:
an outer frame made of microcellular foam resin; and
an inner frame arranged inside the outer frame and made of the microcellular foam resin,
both of the inner frame and the outer frame having openings provided at respective upper portions and recess portions formed downwardly from the openings, respectively,
the recess portions of the inner frame and the outer frame being spaced apart from and face each other,
a surface side of the inner frame functioning as a reflector plate, a space surrounded by the surface side of the inner frame and the opening of the inner frame forming a first light guide space, a rear face side of the inner frame and a surface side of the outer frame functioning as reflector plates, respectively, a space surrounded by a rear face side of the inner frame, the surface side of the outer frame, and the openings of the inner frame and the outer frame forming a second light guide space,
the opening of the inner frame serving as a first light extraction portion, an opening formed around the first light extraction portion and surrounded by the openings of the inner frame and the outer frame serving as a second light extraction portion,
the opening of the inner frame being formed on a substantially same plane,
the opening of the outer frame and the opening of the inner frame being formed on a same plane, or alternatively the opening of the outer frame being arranged behind the opening of the inner frame, and
a first LED light source being arranged in the first light guide space and one or more second LED light sources being arranged in the second light guide space.

2. The LED lighting device according to claim 1, further comprising
a light transmissive member having a first light transmissive portion and a second light transmissive portion, wherein
the light transmissive member has a structure in which the first light extraction portion is covered by the first light transmissive portion and the second light extraction portion is covered by the second light extraction portion,
the opening of the inner frame and the opening of the outer frame are formed on a same plane,
the first light extraction portion and the second light extraction portion are formed on a same plane,
a vicinity of an edge of the opening of the inner frame and a vicinity of an edge of the opening of the outer frame both contact the light transmissive member,
the vicinity of the edge of the opening of the inner frame is fixed to the first light transmissive portion, and
the vicinity of the edge of the opening of the outer frame is fixed to the second light transmissive portion.

3. The LED lighting device according to claim 2, wherein the inner frame and the outer frame formed separately are arranged to be spaced apart from each other,
vicinities of front edges of the openings of the inner frame and the outer frame are fit into grooves formed in a light transmissive member to be supported therewith, respectively, so as to form the second light extraction portion in an entire outer circumference of the inner frame when the inner frame is arranged inside the outer frame, whereby light is capable of being extracted from the entire outer circumference of the inner frame.

4. The LED lighting device according to claim 2, further having frame members, wherein the inner frame and the outer frame formed separately are arranged to be spaced part from each other,
vicinities of front edges of the openings of the inner frame and the outer frame are fit into frame members to be supported therewith, respectively, so as to form the second light extraction portion in an entire outer circumference of the inner frame when the inner frame is arranged inside the outer frame, whereby light is capable of being extracted from the entire outer circumference of the inner frame.

5. The LED lighting device according to claim 2, further comprising a light diffusion layer or a lens structure provided on either a face at a light guide space side of the light transmissive member or an opposite face to the light guide space side.

6. The LED lighting device according to claim 2, wherein a light transmission preventive member is provided on a rear face of the light transmissive member immediately above the first LED light source so as to close a part of the first light extraction portion to shield direct irradiation light from the first LED light source.

7. The LED lighting device according to claim 6, wherein the light transmission preventive member is a resin sheet made of microcellular foam resin having light reflectivity.

8. The LED lighting device according to claim 2, wherein the first LED light source is a white or light yellow colored LED light source, and the second LED light source is a colored LED light source of any of decorative red, yellow, green and blue colors, or an illumination capable of being switched to be used among red, green and blue colors.

9. The LED lighting device according to claim 2, wherein a ratio of illuminance of light from the inner frame to illuminance of light from the outer frame ranges from 1.5 to 3.0.

10. The LED lighting device according to claim 2, wherein the light transmissive member is any one of an acrylic resin, a polycarbonate resin, a glass material, and a resin sheet made of polyester.

11. The LED lighting device according to claim 2, wherein a selector switch is provided and an illumination are capable of being switched to be used between the first LED light source and the second LED light source by switching the selector switch.

12. The LED lighting device according to claim 2, further comprising:
a controller board configured to control the first LED light source and the second LED light source, and
the controller board being a rigid board.

13. The LED lighting device according to claim 1, further comprising
a light transmissive member having a first light transmissive portion and a second light transmissive portion, wherein
the light transmissive member has a structure in which the first light extraction portion is covered by the first light transmissive portion and the second light extraction portion is covered by the second light extraction portion,
the opening of the outer frame is arranged behind the opening of the inner frame,
a vicinity of an edge of the opening of the inner frame and a vicinity of an edge of the opening of the outer frame both contact the light transmissive member,
the vicinity of the edge of the opening of the inner frame is fixed to the first light transmissive portion, and
the vicinity of the edge of the opening of the outer frame is fixed to the second light transmissive portion behind the first light transmissive portion.

14. The LED lighting device according to claim 13, wherein the inner frame and the outer frame formed separately are arranged to be spaced apart from each other,
vicinities of front edges of the openings of the inner frame and the outer frame are fit into grooves formed in a light transmissive member to be supported therewith, respectively, so as to form the second light extraction portion in an entire outer circumference of the inner frame when the inner frame is arranged inside the outer frame, whereby light is capable of being extracted from the entire outer circumference of the inner frame.

15. The LED lighting device according to claim 13, further having frame members, wherein the inner frame and the outer frame formed separately are arranged to be spaced part from each other,
vicinities of front edges of the openings of the inner frame and the outer frame are fit into frame members to be supported therewith, respectively, so as to form the second light extraction portion in an entire outer circumference of the inner frame when the inner frame is arranged inside the outer frame, whereby light is capable of being extracted from the entire outer circumference of the inner frame.

16. The LED lighting device according to claim 13, further comprising a light diffusion layer or a lens structure provided on either a face at a light guide space side of the light transmissive member or an opposite face to the light guide space side.

17. The LED lighting device according to claim 13, wherein a light transmission preventive member is provided on a rear face of the light transmissive member immediately above the first LED light source so as to close a part of the first light extraction portion to shield direct irradiation light from the first LED light source.

18. The LED lighting device according to claim 17, wherein the light transmission preventive member is a resin sheet made of microcellular foam resin having light reflectivity.

19. The LED lighting device according to claim 13, wherein the first LED light source is a white or light yellow colored LED light source, and the second LED light source is a colored LED light source of any of decorative red, yellow, green and blue colors, or an illumination capable of being switched to be used among red, green and blue colors.

20. The LED lighting device according to claim 13, wherein a ratio of illuminance of light from the inner frame to illuminance of light from the outer frame ranges from 1.5 to 3.0.

21. The LED lighting device according to claim 13, wherein the light transmissive member is any one of an acrylic resin, a polycarbonate resin, a glass material, and a resin sheet made of polyester.

22. The LED lighting device according to claim 13, wherein a selector switch is provided and an illumination are capable of being switched to be used between the first LED light source and the second LED light source by switching the selector switch.

23. The LED lighting device according to claim 13, further comprising:
a controller board configured to control the first LED light source and the second LED light source, and
the controller board being a rigid board.

24. The LED lighting device according to claim 1, wherein a front edge of the inner frame is bent in a flange shape in an outer circumferential direction of the inner frame along the first light extraction portion, and
a front edge of the outer frame is bent in a flange shape in an outer circumferential direction of the outer frame in substantially parallel to a reflector plate of a flange shape of the inner frame.

25. The LED lighting device according to claim 1, wherein the first LED light source is arranged on a surface side of the inner frame in the first light guide space, and the second LED light source is arranged on either a rear face side of the inner frame or a surface side of the outer frame in the second light guide space, and
the second LED light source is arranged at a position that is invisible from the second light extraction portion.

26. The LED lighting device according to claim 1, wherein the inner frame has one or two said recess portions, and wherein:
if the inner frame has one said recess portion, the first LED light source is arranged in the one said recess portion, and
if the inner frame has two said recess portions, the first LED light sources comprises two first LED light sources with one of said two first LED light sources arranged in each of the two said recess portions.

27. The LED lighting device according to claim 26, wherein when the inner frame has one said recess portion, the first LED light source is arranged at a wall portion of the recess portion of the inner frame or the first LED light source is arranged in a substantially center of a curved face portion of the recess portion of the inner frame.

28. The LED lighting device according to claim 26, wherein a plurality of said second LED light sources are arranged in the second light guide space.

29. The LED lighting device according to claim 1, wherein shapes of the recess portions of the inner frame and the outer frame each includes: a wall portion formed downwardly and substantially perpendicular to the first light extraction portion; and any one of a curved face shape having a curved face portion opening upwardly, a substantially truncated pyramid shape, and a substantially cuboid shape.

30. The LED lighting device according to claim 1, wherein the outer frame is formed integrally with the inner frame, or integrated after being formed separately.

31. The LED lighting device according to claim 1, wherein the inner frame and the outer frame are integrated with a hinge portion, and the recess portions of both of the inner frame and the outer frame are spaced apart from each other and stacked with the hinge portion being bent.

32. The LED lighting device according to claim 1, wherein on one face of opposing portions of the inner frame and the outer frame, a protrusion portion protruding toward an opposing face or a pillar portion joining the inner frame to the outer frame is formed,
the protrusion portion is configured to abut the opposing face or the pillar portion is configured to connect the inner frame to the outer frame, whereby an arrangement of the inner frame and the outer frame is stabilized.

33. The LED lighting device according to claim 1, wherein the inner frame and the outer frame formed separately are arranged to be spaced part from each other,
on one face of opposing portions of the inner frame and the outer frame, a protrusion portion protruding toward an opposing face or a pillar portion joining the inner frame to the outer frame is formed,
the protrusion portion and the pillar portion are configured to connect the inner frame to the outer frame so as to form the second light extraction portion in an entire outer circumference of the inner frame when the inner frame are arranged inside the outer frame, whereby light is capable of being extracted from the entire outer circumference of the inner frame.

34. The LED lighting device according to claim 1, wherein the inner frame and the outer frame have, as an optical property in a visible light band within a wavelength ranging from 450 to 650 nm, total reflectivity equal to or greater than 90% and diffuse reflectivity equal to or greater than 90% in terms of light reflectivity, respectively.

35. The LED lighting device according to claim 1, wherein the LED lighting device is for an ambient illumination use, an interior illumination use, an automotive illumination use, a rail vehicle use, or an aircraft illumination use.

36. Method of extracting light using an LED lighting device, the LED lighting device comprising:
an outer frame made of microcellular foam resin; and
an inner frame arranged inside the outer frame and made of the microcellular foam resin,
both of the inner frame and the outer frame having openings provided at respective upper portions and recess portions formed downwardly from the openings, respectively,
the recess portions of the inner frame and the outer frame being spaced apart from and face each other,
a surface side of the inner frame functioning as a reflector plate, a space surrounded by the surface side of the inner frame and the opening of the inner frame forming a first light guide space, a rear face side of the inner frame and a surface side of the outer frame functioning as reflector plates, respectively, a space surrounded by a rear face side of the inner frame, the surface side of the outer frame, and the openings of the inner frame and the outer frame forming a second light guide space,
a first LED light source being arranged in the first light guide space and a second LED light source being arranged in the second light guide space,
the opening of the inner frame serving as a first light extraction portion, an opening formed around the first light extraction portion and surrounded by the openings of the inner frame and the outer frame serving as a second light extraction portion,
the opening of the inner frame being formed on a substantially same plane,
the opening of the outer frame and the opening of the inner frame being formed on a same plane, or alternatively the opening of the outer frame being arranged behind the opening of the inner frame, and
the method comprising:
extracting, from the first light extraction portion, light in an opening face direction of the opening of the inner frame, and
extracting, from the second light extraction portion, light in an opening face direction of the opening of the inner frame, or in a direction including either an opening face direction of the opening of the inner frame or a side face direction intersecting therewith at a predetermined angle.

37. The method of extracting light using the LED lighting device according to claim 36, wherein the first LED light source is arranged on a surface side of the inner frame in the first light guide space, and the second LED light source is arranged on either a rear face side of the inner frame or a surface side of the outer frame in the second light guide space, and the second LED light source is arranged at a position that is invisible from the second light extraction portion.

38. The method of extracting light using the LED lighting device according to claim 36, wherein the first light extraction portion and the second light extraction portion are both covered by a light transmissive member, the light transmissive member has a first light transmissive portion and a second light transmissive portion, the first light extraction portion is covered by the first light transmissive portion and the second light extraction portion is covered by the second light transmissive portion, wherein from the first light transmissive portion, light is extracted in an opening face direction of the opening of the inner frame, and from the second light transmissive portion, light is extracted in an opening face direction of the opening of the inner frame, or in a direction including either an opening face direction of the opening of the inner frame or a side face direction intersecting therewith at a predetermined angle.

39. The method of extracting light using the LED lighting device according to claim 36, wherein the inner frame and the outer frame are arranged to be spaced apart from each other, the second light extraction portion is formed in an entire outer circumference of the inner frame when the inner frame are arranged inside the outer frame, whereby light is capable of being extracted from the entire outer circumference of the inner frame.

* * * * *